(12) United States Patent
Okano et al.

(10) Patent No.: US 8,280,935 B2
(45) Date of Patent: Oct. 2, 2012

(54) GRAPHING CALCULATION APPARATUS AND CONTROLLING METHOD OF GRAPHING CALCULATION APPARATUS

(75) Inventors: Mitsuru Okano, Akiruno (JP); Ryo Kaneko, Beaverton, OR (US)

(73) Assignee: Casio Computer Co., Ltd., Tokyo (JP)

( * ) Notice: Subject to any disclaimer, the term of this patent is extended or adjusted under 35 U.S.C. 154(b) by 1329 days.

(21) Appl. No.: 12/001,415

(22) Filed: Dec. 11, 2007

(65) Prior Publication Data

US 2008/0136821 A1   Jun. 12, 2008

(30) Foreign Application Priority Data

Dec. 12, 2006  (JP) .................................. 2006-334822
Apr. 27, 2007  (JP) .................................. 2007-119972

(51) Int. Cl.
*G06F 3/00*  (2006.01)
(52) U.S. Cl. ...................................................... 708/142
(58) Field of Classification Search ........... 708/142–146
See application file for complete search history.

(56) References Cited

U.S. PATENT DOCUMENTS 7,640,490 B2 * 12/2009 Boon ............................ 715/219

FOREIGN PATENT DOCUMENTS

| JP | 2003-186383 A | 7/2003 |
|---|---|---|
| JP | 2005-57347 A | 3/2005 |
| JP | 2006-331184 A | 12/2006 |
| JP | 2008-140150 A | 6/2008 |

OTHER PUBLICATIONS

Japanese Office Action dated Apr. 7, 2009 (and English translation thereof) in counterpart Japanese Application No. 2007-119972.

* cited by examiner

*Primary Examiner* — Tan V. Mai
(74) *Attorney, Agent, or Firm* — Holtz, Holtz, Goodman & Chick, PC

(57) ABSTRACT

A graphing calculation apparatus comprises a mode setting unit which sets one of a manual mode and an automatic mode based on an instruction made by a user. A key data input unit inputs key data entered by the user. The input key data is stored in a key data storing unit in association with the set mode. Calculation of a function is performed based on the stored key data, and a guide display unit displays the stored key-data as guide data. For displaying the key data associated with the manual mode, when the key data corresponding to the guide data is input, subsequent key data is displayed as guide data. For displaying the key data associated with the automatic mode, the guide data is automatically input in succession and subsequent key data is sequentially displayed as guide data.

6 Claims, 21 Drawing Sheets

GRAPHING CALCULATION APPARATUS AND CONTROLLING METHOD OF GRAPHING CALCULATION APPARATUS

CROSS-REFERENCE TO RELATED APPLICATIONS

This application is based upon and claims the benefit of priority from prior Japanese Patent Applications No. 2006-334822, filed Dec. 12, 2006; and No. 2007-119972, filed Apr. 27, 2007, the entire contents of both of which are incorporated herein by reference.

BACKGROUND OF THE INVENTION

1. Field of the Invention

The present invention relates to a graphing calculation apparatus and control method of the graphing calculation apparatus.

2. Description of the Related Art

A conventional electronic calculation apparatus, which calculates an arbitrary input arithmetic expression and solves an arbitrary input function, is in practical use. The conventional electronic calculation apparatus also displays a calculation result of the input expression, a solution or a graph of the input function. Such an electronic calculation apparatus is also referred to as a graphing calculator.

The graphing calculator is utilized in a field of education. A person who is to be educated (a student) uses the graphing calculator to calculate an arithmetic expression and to plot a graph of a function.

In the field of education, a teacher may provide an operational procedure of the graphing calculator. The teacher provides the operational procedure to the student by demonstrating the operations or distributing printed operation manuals.

However, the graphing calculation apparatus generally has a variety of functions, and complicated operations are required to use the variety of functions. It may be difficult for the student to master the complicated operations for the functions.

For example, Jpn. Pat. Appln. KOKAI Publication No. 2003-186383 discloses an electronic apparatus such as a personal computer (PC) and a program for the electronic apparatus that facilitates learning an operational procedure of a scientific calculator. An emulator of the scientific calculator is installed in the electronic apparatus. Information of key operation (operational procedure) performed by a teacher to solve a given problem is associated with explanatory information of the key operation. Then, a learning support program is generated which utilizes the key operation information and the explanatory information. The generated support program is transferred to the scientific calculator of a student. When the student activates the transferred program, the key operation information and the explanatory information are displayed on a window. Consequently, by reference to the display window, the student can operate the same keys as the teacher has operated.

However, settings of the above electronic apparatus may not depend on a problem to be solved or a learning level of the student. That is, it is not selectable whether the student manually operates the keys by reference to the display window or the keys are automatically operated while the student is viewing the display window. Furthermore, it can not be selected to merely display a final solution.

BRIEF SUMMARY OF THE INVENTION

According to an embodiment of the present invention, a graphing calculation apparatus capable of calculating a function comprises:

a mode setting unit configured to set one of a manual mode and an automatic mode based on an instruction made by a user;

a key data input unit configured to input key data in accordance with operation of a key input unit performed by the user;

a key data storing unit configured to store the key data input by the key data input unit in association with the mode set by the mode setting unit;

a first calculation unit configured to cause calculation of a function based on the key data stored by the key data storing unit;

a guide display unit configured to display the stored key data, as guide data, in order of storage;

a guide control unit configured to control the guide display unit in such a manner that in a case where the guide display unit displays key data associated with the manual mode, when the key data corresponding to the guide data is input by the key input unit, subsequent key data is displayed as guide data, and in a case where the guide display unit displays key data associated with the automatic mode, the guide data is automatically input in succession and subsequent key data is sequentially displayed as guide data; and a second calculation unit configured to cause calculation of a function based on key data which is input along with control by the guide control unit for the guide display unit.

According to another embodiment of the present invention, a graphing calculation apparatus capable of plotting a graph of a function on a display unit comprises:

an expression input unit configured to input an expression of a function in accordance with operation performed by a user;

a first graph plot unit configured to plot a graph of the function on the display unit;

a solution instructing unit configured to instruct to derive a characteristic point of the graph plotted by the first graph plot unit in accordance with operation including a plurality of items of operational procedure performed by the user;

a first solution display controlling unit configured to control the display unit to display derivation process of the characteristic point of the graph in accordance with the operation including a plurality of items of operational procedure;

a final display setting unit configured to set the display unit to display only final result of the derivation process of the characteristic point;

an instruction storing unit configured to store instruction by the solution instructing unit together with the expression of the function input by the expression input unit;

a stored function display control unit configured to control the display unit to display the expression of the function stored in the instruction storing unit;

a second graph plot unit configured to plot, in a state in which the function stored in the instruction storing unit is being displayed on the display unit, a graph of the function on the display unit in accordance with operation by the user; and a second solution display controlling unit configured to control the display unit in such a manner that when the display unit is not set by the final display setting unit to display only final result of the derivation process of the characteristic point of the graph, the characteristic point of the graph is derived in accordance with the operation including the plurality of items of operational procedure and the derivation process of the characteristic point of the graph is sequentially displayed, and when the display unit is set by the final display setting unit to display only final result of the derivation process of the characteristic point of the graph, the characteristic point of the graph is derived in accordance with the operation including the plurality of items of operational procedure and only the final result of the derivation process of the characteristic point of the graph is displayed.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which.

DETAILED DESCRIPTION OF THE INVENTION

An embodiment of a graphing calculation apparatus according to the present invention will now be described with reference to the accompanying drawings.

First Embodiment

Figure 1:
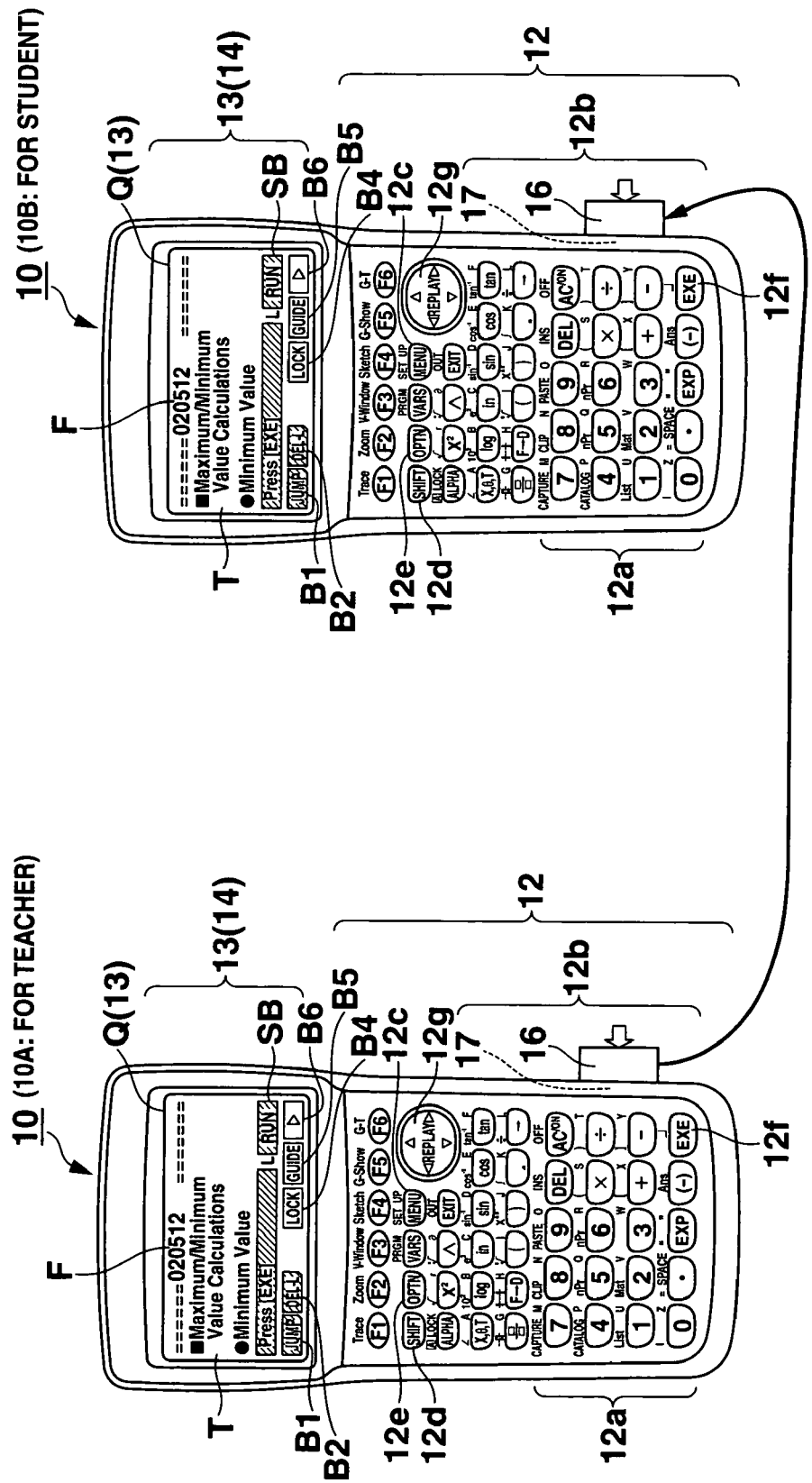
FIG. 1 is an external view of graphing calculators 10A and 10B.
Figure 2:
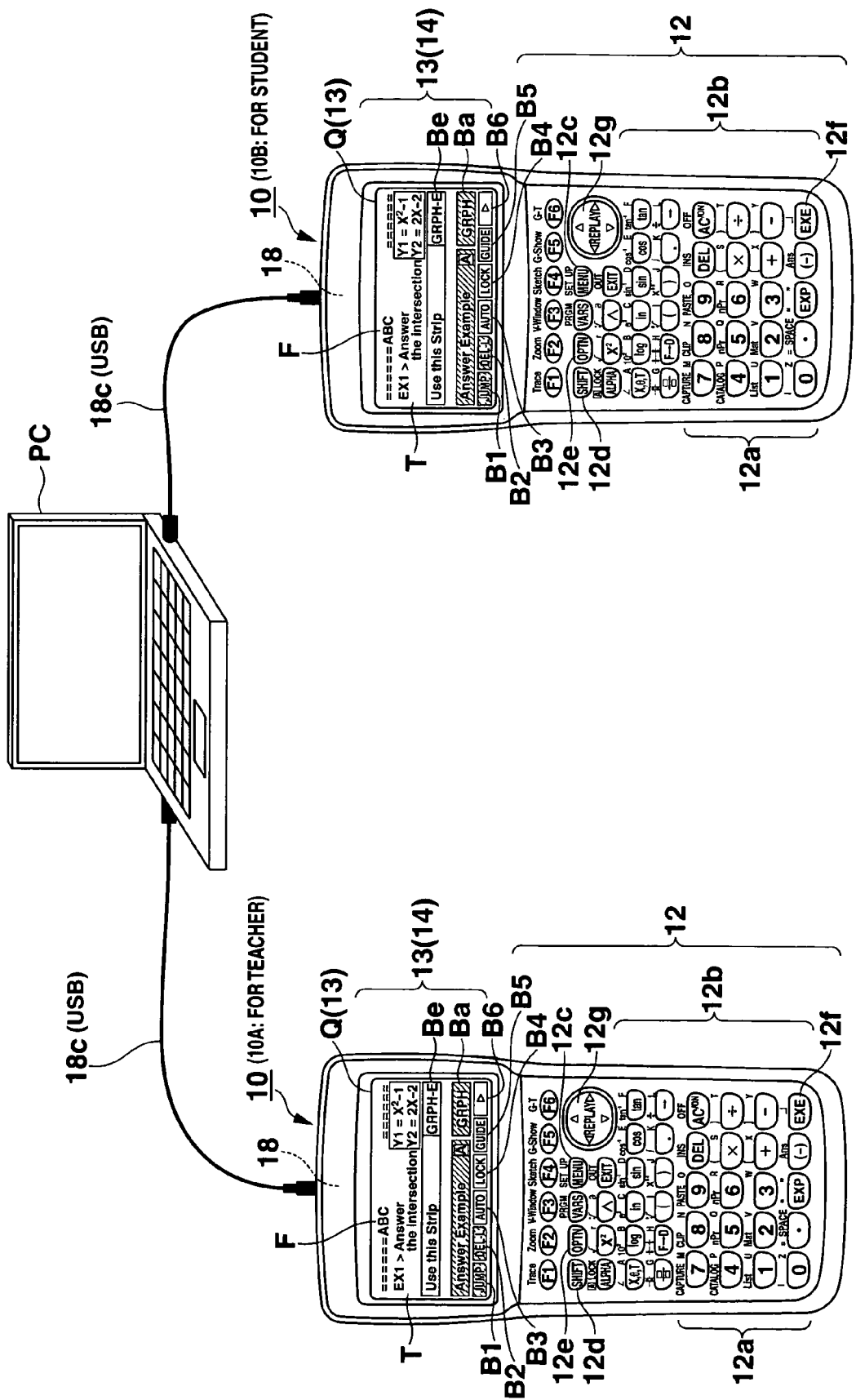
FIG. 2 is another external view of the graphing calculators 10A and 10B.

FIG. 1 is an external view of graphing calculators 10A and 10B. FIG. 2 is another external view of the graphing calculators 10A and 10B.

Hereinafter, a graphing calculator according to the present embodiment is indicated by a reference numeral 10. Moreover, the graphing calculator 10 which a teacher uses is indicated by 10A, and the graphing calculator 10 which a student uses is indicated by 10B. The graphing calculators 10A and 10B have the same configurations.

A key input unit 12 is provided on a lower portion of a front surface of the graphing calculator 10 (10A and 10B). A liquid crystal display unit (LCD) 13 is provided on an upper portion of the front surface of the graphing calculator 10. A transparent tablet 14 is laid on the LCD 13.

The key input unit 12 includes numeral input keys 12a, function/symbol keys 12b, a menu key 12c, a shift key 12d, an option key 12e, an execution key 12f, cursor keys 12g, and function keys F1 to F6.

The numeral input keys 12a are used to input numeral data. The function/symbol keys 12b are used to input data of operators and function symbols.

When the menu key 12c is depressed, the LCD 13 displays a menu window. In the present embodiment, a user can select one mode from operation modes displayed in the menu window. The operation modes include a calculation mode, a graph mode, an e-Activity mode, and a program mode. In the calculation mode, an input arithmetic expression is calculated and an input function is solved. In the graph mode, a graph of an input function is plotted. The e-Activity mode is a mode for executing e-Activity learning to be described later. Furthermore, a program input by the user is executed in the program mode.

When the shift key 12d is depressed together with any key of the key input unit 12, data is input of a symbol or a function shown at upper left of the key depressed with the shift key 12d.

When the option key 12e is depressed together with any key of the key input unit 12, data is input of a symbol or a function shown at upper right of the key depressed with the option key 12e.

The execution key 12f is depressed for inputting an instruction to determine a selection or to execute processing.

The cursor keys 12g are utilized for inputting an instruction to move a cursor, to select displayed data, to switch display, or the like.

The function keys F1 to F6 respectively correspond to function indicators B1 to B6 shown at a bottom portion of the display area of the LCD 13. Various functions are allocated to the function indicators B1 to B6 depending on the operation modes. When any of the function keys F1 to F6 is depressed, execution of a function indicated by a function indicator corresponding to the depressed key is instructed.

Figure 3:
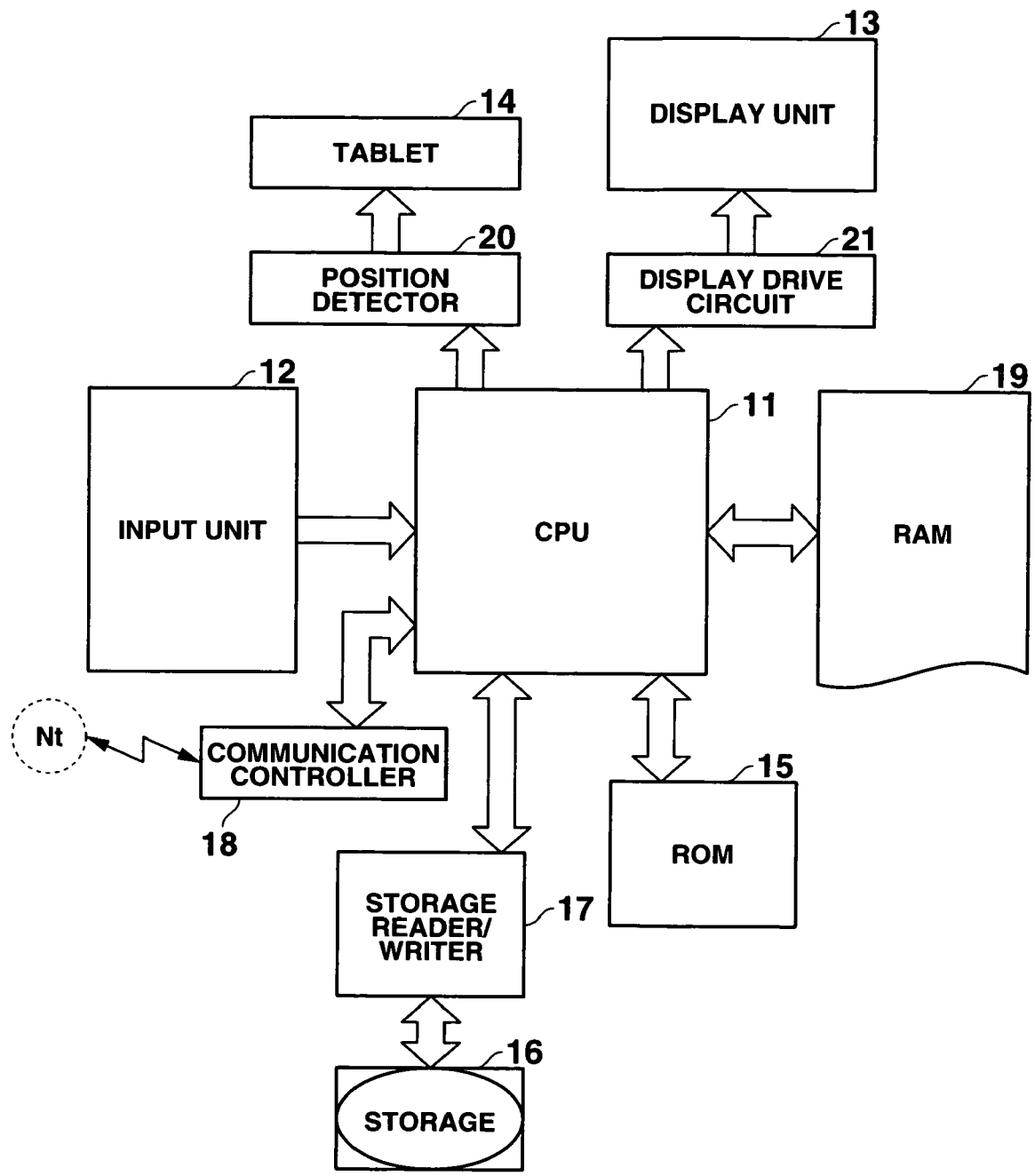
FIG. 3 is a block diagram showing an electric configuration of a graphing calculator 10.

FIG. 3 is a block diagram showing an electric configuration of the graphing calculator 10.

The graphing calculator 10 (10A and 10B) includes a control unit 11 including a central processing unit (CPU). To the control unit 11, connected are the key input unit 12, a read only memory (ROM) 15, a random access memory (RAM) 19, a storage reader/writer 17, and communication controller 18. Moreover, the LCD 13 is connected to the control unit 11 through a display drive circuit 21, and the tablet 14 is connected to the control unit 11 through a position detector 20.

When the control unit 11 receives input information such as key input information from the key input unit 12 or touch position information detected by the position detector 20 when the user touches a point on the tablet 14, the control unit 11 activates a processing program in response to the input information. The control unit 11 controls each unit of the graphing calculator 10 based on the activated program.

The ROM 15 preliminary stores a system program or a control program for controlling whole operation of the graphing calculator 10. The ROM 15 may store processing program (s) in advance for executing a variety of functions of the graphing calculator 10.

An external storage 16, which can be detachably attached to the graphing calculator 10, may preliminary store the processing program(s). The processing program(s) stored in the external storage 16 is read out by the storage reader/writer 17, and is executed by the control unit 11. Alternatively, the processing program(s) stored in an external terminal apparatus may be obtained by the communication controller 18 via a network Nt.

The RAM 19 is utilized as a working memory when the CPU 11 controls the graphing calculator 10.

When the user touches a point on the tablet 14, the tablet 14 generates a voltage signal corresponding to the touched position. The position detector 20 detects coordinates of the touched position based on the generated voltage signal. The detected coordinate information is transferred to the control unit 11. The control unit 11 determines an operation to execute in response to the coordinate information.

The external storage 16 stores data generated in the graphing calculator 10. The storage reader/writer 17 reads the data stored in the external storage 16. Therefore, data generated in the graphing calculator 10A that the teacher uses can be carried to the graphing calculator 10B that the student uses, via the external storage 16 (see FIG. 1).

The communication controller 18 can send the data generated in the graphing calculator 10 to an external personal computer (PC) through a USB cable 18c. Moreover, the communication controller 18 can receive data transferred from the external PC. Accordingly, data communication via the USB cable 18c between the graphing calculators 10A and 10B is available.

Figure 4:
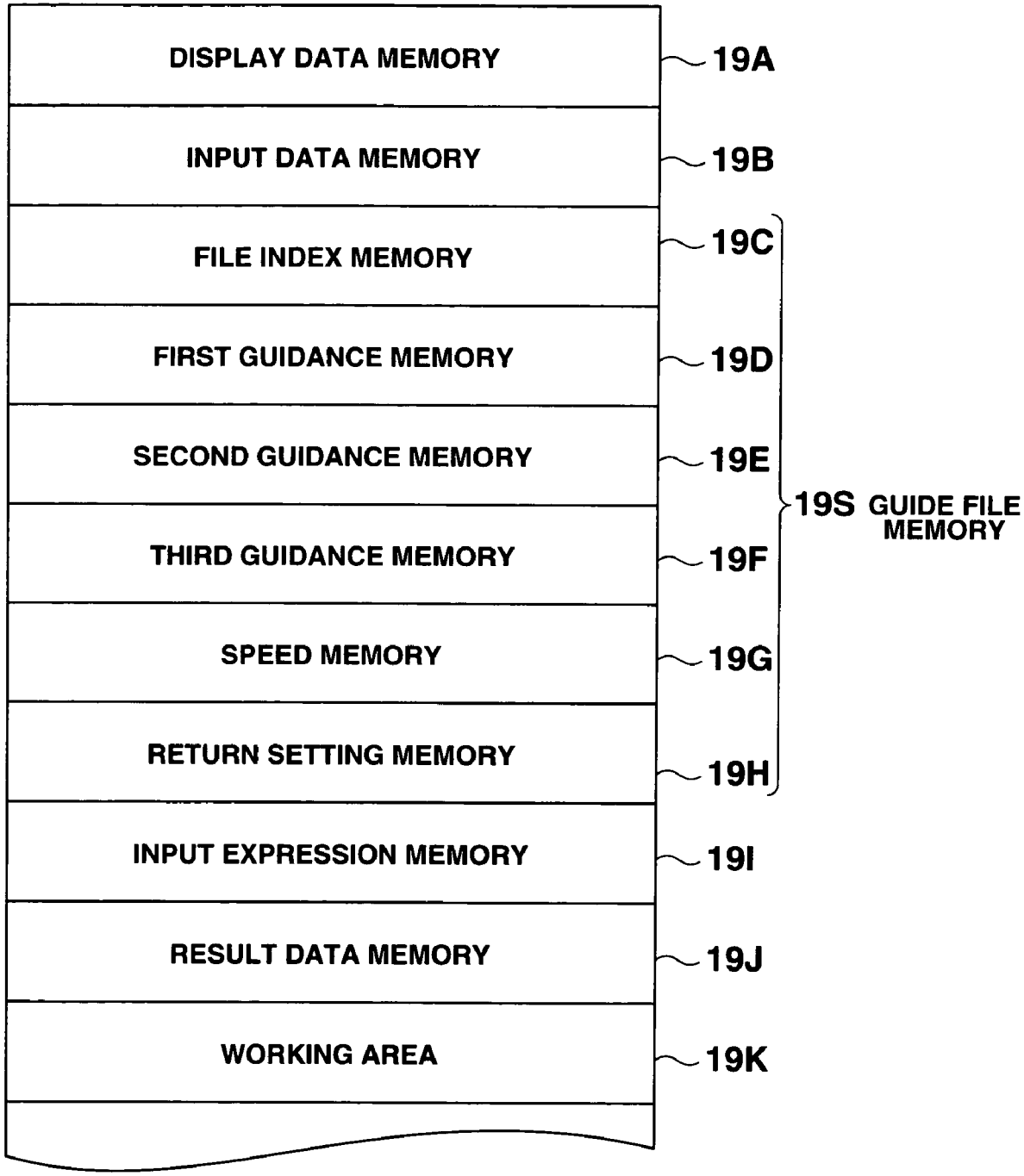
FIG. 4 is a view showing storage areas prepared in a RAM 19 according to a first embodiment.

FIG. 4 is a view showing storage areas prepared in the RAM 19 according to the present embodiment.

The RAM 19 includes storage areas such as a display data memory 19A, an input data memory 19B, a guide file memory 19S (including storages areas 19C to 19H), an input expression memory 19I, a result data memory 19J, and a working area 19K.

The guide file memory 19S is utilized for executing "e-Activity learning" as described later. The guide file memory 19S can be divided into a file index memory 19C, a first guidance memory 19D, a second guidance memory 19E, a third guidance memory 19F, a speed memory 19G, and a return setting memory 19H.

The display data memory 19A stores display data to be displayed on the LCD 13 in the form of bitmap. The input data memory 19B stores key input data of a numeral or a symbol input by operation of the key input unit 12.

The file index memory 19C stores identification data (for example, file name F and item data T) of a guide file created in a guide file creation process which will be described later (see FIG. 5). Data about a strip button SB generated in the guide file creation process (see FIG. 5) is also stored in the file index memory 19C.

Figure 6:
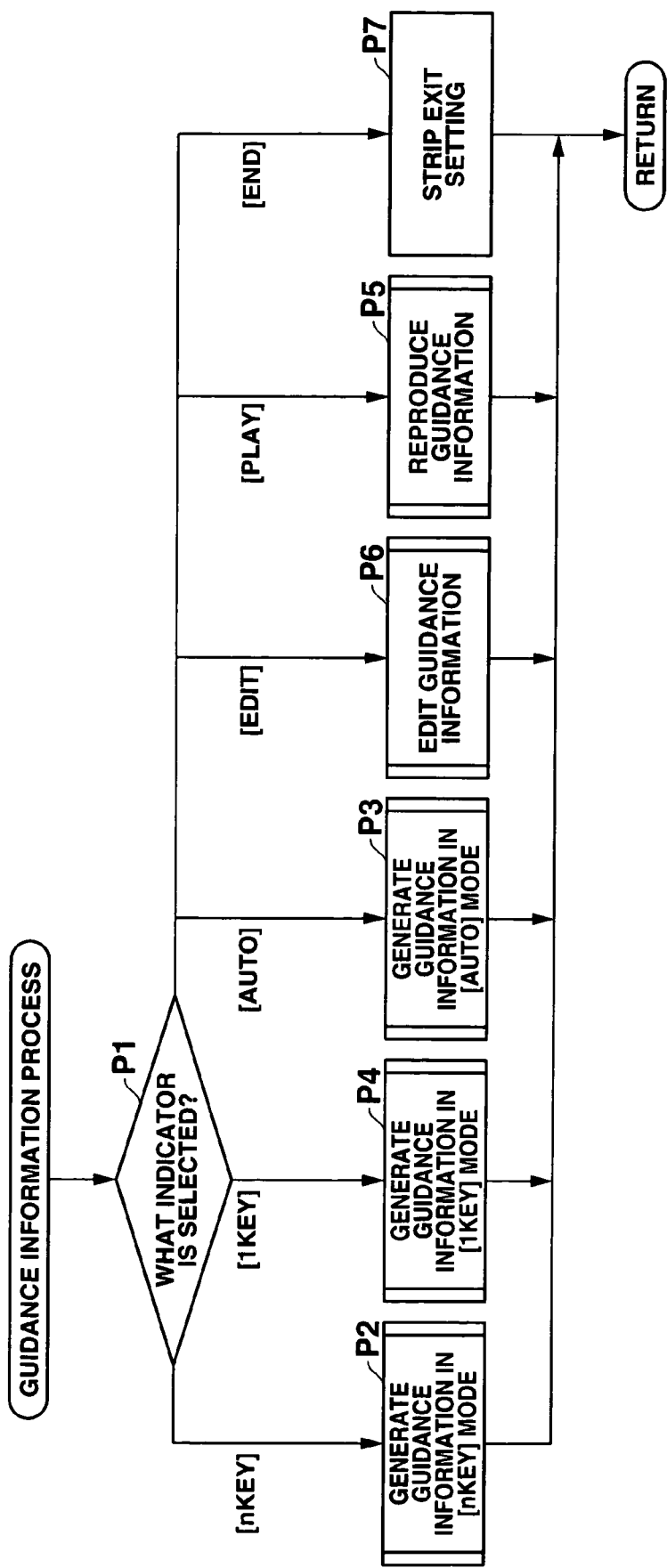
FIG. 6 is a flow chart of a guidance information process according to the first embodiment.

The first guidance memory 19D is a storage area which stores guidance information generated in an [n key] mode of a guidance information process shown in FIG. 6. The second guidance memory 19E stores guidance information generated in an [auto] mode of the guidance information process. The third guidance memory 19F stores guidance information generated in a [1 key] mode of the guidance information process.

The speed memory 19G stores an automatic reproduction speed of the guidance information. The automatic reproduction speed is set in the guidance information process shown in FIG. 6. Stored in the return setting memory 19 is setting data (on/off) of "Strip Exit" to be set in the guidance information process.

The input expression memory 19I stores an arithmetic expression or a mathematical function input by a user. The result data memory 19J stores a calculation result of the input expression or a solving result of the function. The working area 19K stores a variety of data utilized by the control unit 11 for controlling the graphing calculator 10.

Subsequently, the e-Activity learning according to the present embodiment will be explained.

The e-Activity learning is a system for learning an operational method (operational procedure) of the graphing calculator 10. The e-Activity learning includes the following elements.

1) A user of the graphing calculator 10A (teacher) creates a guide file.

2) The teacher generates guidance information and stores the guidance information into the guide file.

3) The guide file is supplied to the graphing calculator 10B.

4) A user of the graphing calculator 10B (student) executes learning utilizing the guidance information stored in the created guide file.

In the present embodiment, the guidance information includes operational information of key operation, which the teacher desires the student to practice in order to calculate or to solve a given problem, and corresponding explanatory information. Generation of the guidance information is executed in one of an automatic mode ([auto] mode) and manual modes ([n key] mode and [1 key] mode). The guidance information generated in the automatic mode will be automatically reproduced in the graphing calculator 10B. The guidance information generated in a manual mode will be manually reproduced in the graphing calculator 10B. Furthermore, the teacher can edit and reproduce the guidance information contained in the guide file.

When a user (teacher or student) of the graphing calculator 10 (10A or 10B) depresses the menu key 12c of the key input unit 12, the LCD 13 displays a menu window. The menu window includes modes settable in the graphing calculator 10. The user can select an e-Activity mode from the menu. The above e-Activity learning is available in the e-Activity mode.

Hereinafter, creation of the guide file will be described, in accordance with the present embodiment. When the user designates execution of the guide file creation process, the guide file creation process shown in FIG. 5 is activated.

Figure 5:
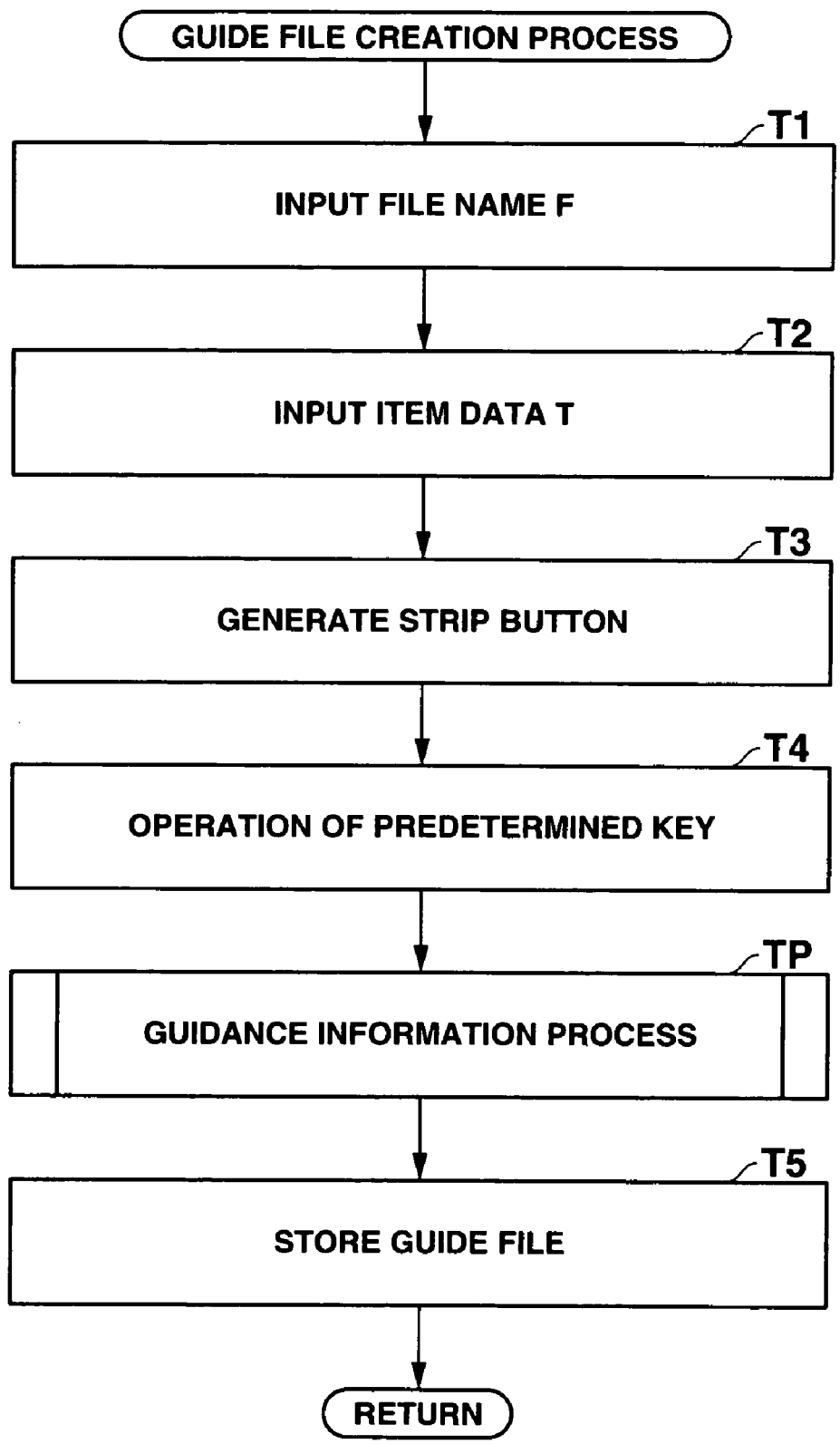
FIG. 5 is a flowchart of a guide file creation process according to the first embodiment.

FIG. 5 is a flowchart of the guide file creation process according to the present embodiment. The guide file creation process is executed in the graphing calculator 10A that the teacher uses. A guide file for storing guidance information is created in the guide file creation process.

When the guide file creation process is activated, the user (teacher) firstly inputs a file name F of the guide file to be created (step T1). Further, the teacher inputs item data T (e.g., title of a problem that the teacher gives to the student) for identifying the contents of data to be stored in the guide file (step T2). The data input in the steps T1 and T2 are stored in the file index memory 19C. Also, the LCD 13 displays an e-Activity window Q including the input file name and item data.

For example, the LCD 13 of the graphing calculator 10A shown in FIG. 1 represents a display state of the case in which "020512" is input as the file name F and "Maximum/Minimum Value Calculation" is input as the item data T.

Next, the user (teacher) operates the key input unit 12 and/or the tablet 14 to generate a strip button SB on the display window of the LCD 13 (step T3). The teacher may arbitrarily locate the strip button SB on the LCD 13 by means of the cursor keys 12g and/or the tablet 14. The user operates the key input unit 12 to set characters to be shown on the strip button SB. The strip button SB which contains two items of "Press [EXE]" and "RUN" is displayed on the e-Activity window Q in FIG. 1.

Thereafter, when the user (teacher) operates a predetermined key (step T4), the after-mentioned guidance information process is activated (step TP). In the present embodiment, the function indicator B5 (guide) is an indicator of the function to activate the guidance information process (see FIG. 1). When the function key F5, which corresponds to the function indicator B5, is operated, the guidance information process is activated. The contents of the guidance information process will be described later.

The guidance information to be stored in the guide file is generated in the guidance information process, and the storage areas prepared in the RAM 19 store appropriate data. After the generation of the guidance information, the guide file having the file name F, which is stored in the file index memory 19C, and including the generated guidance information is created to be stored in the external storage 19 (step T5).

In the case in which any guidance information is not generated in the guidance information process, a guide file having merely the file name F, the item data T, and the setting information of the strip button SB (an empty guide file) is created.

The external storage 16 can be detached from the graphing calculator 10A and can be attached to the graphing calculator 10B. Consequently, the user of the graphing calculator 10B (student) comes to be possible to use the created guide file. Alternatively, the created guide file may be exchanged via the USB cable 18c.

It should be noted that a single guide file may store a plurality of items of guidance information in the present embodiment.

Subsequently described is a process executed in the graphing calculator 10A for generating guidance information to be stored in a guide file and for editing guidance information stored in a guide file.

FIG. 6 is a flowchart of the guidance information process. The guidance information process is activated (step TP in FIG. 5) when the predetermined key (function key F5 in the present embodiment) is depressed in step T4 of the above guide file creation process. In this case, the display of the LCD 13 is switched to show a guidance information generation window H1 as indicated in (A) of FIG. 7. Indicators such as [n key], [1 key], [AUTO], and the like appear on the guidance information generation window H1 as shown in illustration. For each indicator, a corresponding function key is set. Hereinafter, a guide file which is presently in process of creation is referred to as an objective guide file f1.

When a function key corresponding to the indicator of [n key] is depressed at the display state shown by (A) of FIG. 7 ([n key] in step P1 of FIG. 6), an [n key] mode to be described later is set to generate guidance information which is to be stored in the objective guide file f1 (step P2 in FIG. 6). When a function key corresponding to the indicator of [1 key] is depressed ([1 key] in step P1 of FIG. 6), a [1 key] mode to be described later is set to generate guidance information which is to be stored in the objective guide file f1 (step P4 in FIG. 6). Similarly, when a function key corresponding to the indicator of [AUTO] is depressed ([AUTO] in step P1 of FIG. 6), an [AUTO] mode to be described later is set to generate guidance information which is to be stored in the objective guide file f1 (step P3 in FIG. 6). The above modes of [n key] mode, [1 key] mode, and [AUTO] mode are included in recording modes (REC modes) for generating guidance information.

Subsequently, a generation process of the guidance information in the [n key] mode will be described. When the function key corresponding to the indicator of [n key] is depressed while the guidance information generation window H1 is being displayed on the LCD 13, the [n key] mode is set. In the [n key] mode, key input data of (a series of) keys operated by the teacher is generated as operational information. The operational information may include sequence data which indicates operation orders of the series of keys. A single item of explanatory information is input and associated with the operational information for the series of key operations.

Figure 7:
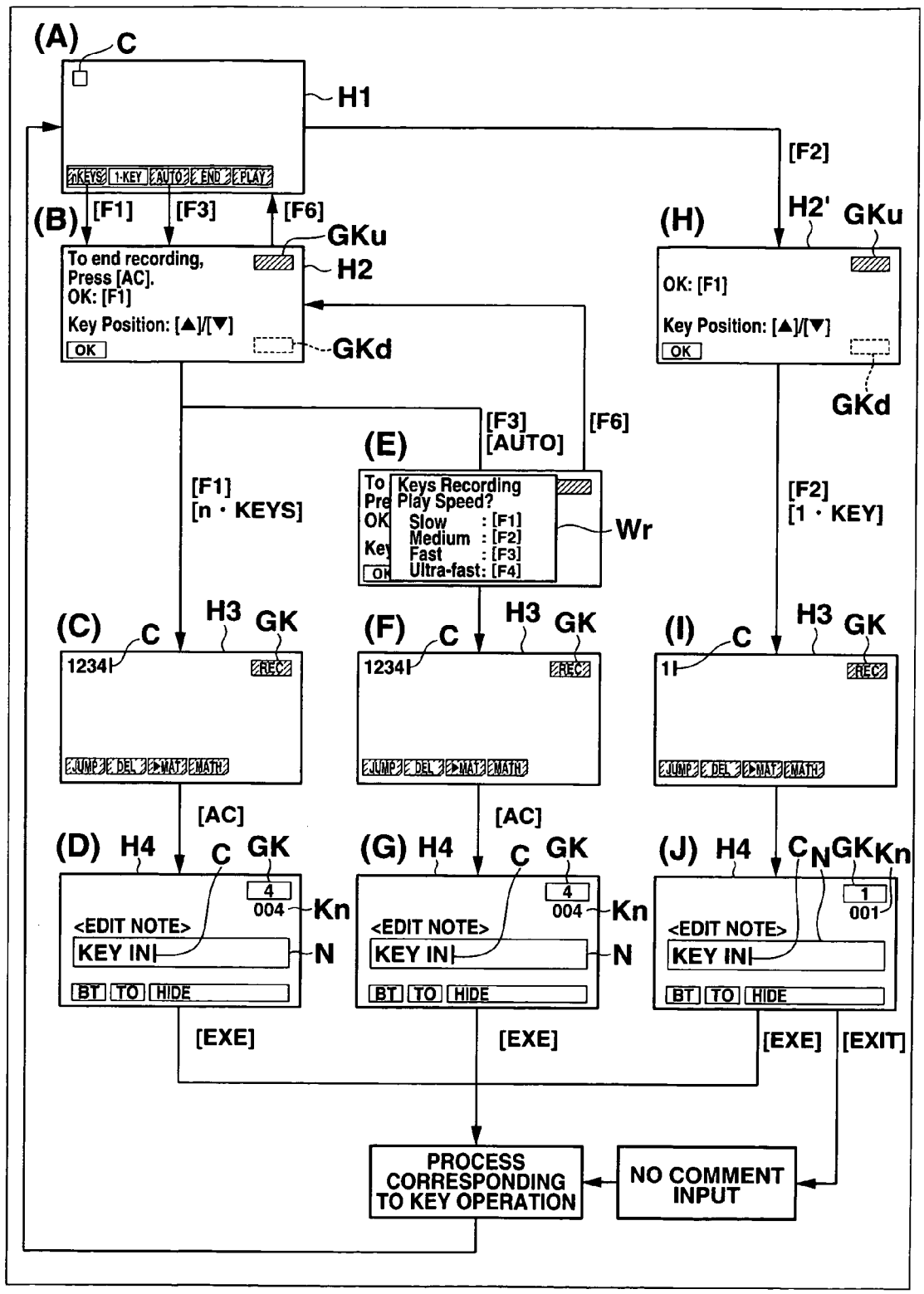
FIG. 7 is a view showing an example of display transition which accompanies the guidance information process according to the first embodiment.

When the [n key] mode is set, the LCD 13 displays a window H2 indicated by (B) of FIG. 7, for example. A message "To end recording, Press [AC]." contained in the window H2 notifies the user (teacher) that it is required to operate an AC key of the key input unit 12 at the end of the series of key operations. A message of "OK: [F1]." contained in the window H2 notifies the teacher that the series of keys become operable after the function key F1 is operated. Moreover, a message "Key Position: [Δ]/[∇]" prompts the teacher to decide whether a guide area GK is displayed at an upper area GKu of the LCD 13 or a lower area GKd. The teacher may select a display position of the guide area GK by operating the cursor keys 12g.

After operating the function key F1, the teacher may operate a series of keys to input key data of the series of keys. When the teacher operates the series of keys, characters, numerals, and symbols are input in accordance with the operations. A key input window H3 shown in (C) of FIG. 7 represents a case in which numeral keys "1", "2", "3", and "4" are operated in succession and key data of the numeral keys are input. Moreover, (C) of FIG. 7 shows the display state wherein the upper area GKu is selected as the display area of the guide area GK. Since the presently set [n key] mode is one of the recording modes, "REC" is displayed on the guide area GK to indicate the present mode.

In the following description, operation order of the keys is expressed by a "sequential index". For example, in the case where the above four numeral keys 1 to 4 are sequentially operated, key data of the numeral key 1 which is firstly operated is associated with the sequential index 1. The sequential index 1 is indicative of the key firstly operated. Similarly, key data of the numeral key 2 which is operated secondly is associated with the sequential index 2 indicative of the key operated secondly, key data of the numeral key 3 operated thirdly is associated with the sequential index 3, and key data of the numeral key 4 operated fourthly is associated with the sequential index 4.

When the teacher intends to add a single item of explanatory information to the operational information of the sequence of key operations, the teacher is required to operate the AC key after last operation of the sequence of key operations. After depressing the AC key, it comes to be possible to input the explanatory information. The input explanatory information is displayed on the LCD 13. A explanation input window H4 shown by (D) of FIG. 7 represents a case in which "KEY IN" is input as explanatory information in a comment area N. On the explanation input window H4 indicated by (D) of FIG. 7, the key data "4" of the key operated lastly in the above series of key operations is displayed in the guide area GK. In a display area Kn which is adjacent to the guide area GK, the sequential index 4 corresponding to the key operated lastly is displayed as "004". Displayed in the display area Kn is a sequential index corresponding to a key operated lastly. Therefore, the sequential index displayed in the display area Kn indicates the number of keys which have been operated in the series of key operations.

When the user operates the execution key 12f, the control unit 11 stores operational information including key data input by the series of key operations, input explanatory information, and a set display position of the guide area GK in the first guidance memory 19D as guidance information. The operational information may include sequence data (sequential index) which represents the operation order of the series of keys. Thereafter, a process according to the operations of the series of keys is executed (e.g., in the case where an arithmetic expression such as "10+2" is input, a calculation process of the arithmetic expression is executed). The execution result is stored in the result data memory 19J.

The above process allows the user of the graphing calculator 10A (teacher) to input a single item of explanatory information for operational information of operations of a series of keys. The operational information of operations of the series of keys (key input data of operated keys and information of operational sequence) and explanatory information of the operational information are stored as guidance information in the first guidance memory 19D. The guidance information can be stored into the objective guide file f1.

Thereafter, the display of the LCD 13 is restored to the guidance information generation window H1.

In the case where the LCD 13 is displaying the window H2, when the teacher operates the function key F6, the display of the LCD 13 is restored to the guidance information generation window H1.

In the case where the LCD 13 is displaying the window H2, when the teacher operates the function key F1, inputting key data comes to be possible. However, there may be a case in which the teacher operates the AC key without operating any other key even though inputting key data is possible. In such a case, the display of the LCD 13 is restored to the guidance information generation window H1.

Furthermore, there may be a case in which the teacher operates the execution key 12f without inputting any explanatory information in the explanation input window H4. In such a case, the input process of the explanatory information is not executed and the display of the LCD 13 is restored to the guidance information generation window H1. The guidance information includes merely the operational information of the operations of the series of keys.

The following is description of a generation process of the guidance information executed in the [AUTO] mode. When the function key corresponding to the indicator of [AUTO] is depressed while the guidance information generation window H1 is being displayed on the LCD 13, the [AUTO] mode is set. When the student utilizes the guidance information which is generated in the [AUTO] mode for the e-Activity learning performed in the graphing calculator 10B, the guidance information is automatically reproduced. In the [AUTO] mode, key input data of (a series of) keys operated by the teacher is generated as operational information. The operational information may include sequence data which indicates operation sequence of the series of keys. A single item of explanatory information is input and associated with the operational information for the operations of the series of keys.

When the [AUTO] mode is set, similarly to the case of the above-described [n key] mode, the LCD 13 displays the window H2 indicated by (B) of FIG. 7, for example. The message "To end recording, Press [AC]." contained in the window H2 notifies the user (teacher) that it is required to operate the AC key of the key input unit 12 at the end of the series of key operations. A message of "OK: [F1]." contained in the window H2 notifies the teacher that the series of key operations become possible after the function key F1 is operated. Moreover, a message "Key Position: [Δ]/[∇]" prompts the teacher to decide whether a guide area GK is displayed on the area GKu or the area GKd. The teacher may select the display position of the guide area GK by operating the cursor keys 12g.

When the teacher operates the function key F1, a reproduction speed selection window Wr indicated by (E) of FIG. 7 is generated.

The teacher may select one of reproduction speeds displayed on the speed selection window Wr. When, in the graphing calculator 10B, the guidance information generated in the [AUTO] mode is automatically reproduced, the automatic reproduction is executed at the selected reproduction speed. The selected reproduction speed is stored in the speed memory 19G. The teacher may select one from a low speed (Slow), a medium speed (Medium), a high speed (Fast), and an ultra high speed (Ultra-fast) shown in the speed selection window Wr. To select the low speed, the function key F1 should be operated, and to select the medium speed, the function key F2 should be operated. To select the high speed, the teacher depresses the function key F3. When the teacher operates the function key F4, the ultra-high speed is selected. The teacher can select one of the reproduction speeds in consideration of a learning level of the student.

When one reproduction speed is selected, the teacher may operate a series of keys to input key data of the series of keys. When the teacher operates the series of keys, characters, numerals, and symbols are input in accordance with the operations. A key input window H3 shown in (C) of FIG. 7 represents a case in which numeral keys "1", "2", "3", and "4" are operated in succession and key data of the numeral keys are input. Moreover, (F) of FIG. 7 shows that the upper area GKu is selected as the display area of the guide area GK. Since the presently set [AUTO] mode is one of the recording modes, "REC" is displayed on the guide area GK to indicate the present mode. In the same manner as in the case of the [n key] mode, operation order of the keys is expressed by the sequential index.

When the teacher intends to add a single item of explanatory information to the operational information of the sequence of key operations, the teacher should operate the AC key after operation of the numeral key 4. When the teacher depresses the AC key, it comes to be possible to input the explanatory information. The input explanatory information is displayed on the LCD 13. A explanation input window H4 shown by (G) of FIG. 7 represents a case in which "KEY IN" is input as explanatory information in a comment area N. On the explanation input window H4 shown by (G) of FIG. 7, the key data "4" of the key lastly operated in the above series of key operations is displayed in the guide area GK. In the display area Kn which is adjacent to the guide area GK, the sequential index 4 corresponding to the key lastly operated is displayed as "004". Displayed in the display area Kn is a sequential index corresponding to the key operated lastly. Therefore, the sequential index displayed in the display area Kn indicates the number of keys operated in the series of key operations.

When the user operates the execution key 12f, operational information including key data input by the series of key operations, input explanatory information, and a set display position of the guide area GK are stored in the third guidance memory 19F as guidance information. The operational information may include sequence data (sequential index) which represents the operation order of the series of key operations. Thereafter, a process corresponding to the operations of the series of keys is executed.

The above process allows the user of the graphing calculator 10A (teacher) to input a single item of explanatory information for operational information of operations of a series of keys. The operational information of operations of the series of keys (key input data of operated keys and information of operational sequence) and explanatory information of the operational information are stored as guidance information in the third guidance memory 19F. The guidance information can be stored into the guide file f1.

Thereafter, the display of the LCD 13 is restored to the guidance information generation window H1.

In the case where the speed selection window Wr is being displayed on the LCD13, when the teacher operates the function key F6, the LCD 13 comes to display the window H2.

In the case where the LCD 13 is displaying the window H2, when the teacher operates the function key F1, inputting key data comes to be possible. However, there may be a case in which the teacher operates the AC key without operating any other key even though inputting key data is possible. In such a case, the display of the LCD 13 is restored to the guidance information generation window H1.

Furthermore, there may be a case in which the teacher operates the execution key 12f without inputting any explanatory information in the explanation input window H4. In such a case, the input process of the explanatory information is not executed and the display of the LCD 13 is returned to the guidance information generation window H1. The guidance information includes merely the operational information of the operations of the series of keys.

Next, a generation process of the guidance information in the [1 key] mode will be described. When the function key corresponding to the indicator of [1 key] is depressed while the guidance information generation window H1 is being displayed on the LCD 13, the [1 key] mode is set. In the [1 key] mode, key input data of a key operated by the teacher is generated as operational information. A single item of explanatory information is input and associated with the operational information for the operation of the key.

When the [1 key] mode is set, the LCD 13 displays a window H2' indicated by (H) of FIG. 7, for example. A message of "OK: [F1]." contained in the window H2' notifies the teacher that the key operation becomes possible after the function key F1 is operated. Moreover, a message "Key Position: [Δ]/[∇]" prompts the teacher to decide whether the guide area GK is displayed on the area GKu or on the area GKd. The teacher may select the display position of the guide area GK by operating the cursor keys 12g.

After operating the function key F1, the teacher may operate a key to input key data of the key. When the teacher operates the key, a character, a numeral, or a symbol is input in accordance with the operation. A key input window H3 shown in (I) of FIG. 7 represents a case in which a numeral key "1" is operated and key data of the numeral key is input. Moreover, (I) of FIG. 7 shows the display state wherein the upper area GKu is selected as the display area of the guide area GK. Since the presently set [1 key] mode is one of the recording modes, "REC" is displayed on the guide area GK to indicate the present mode. It should be noted that the key data of the operated key corresponds to the sequential index 1.

When the teacher depresses one key, it comes to be possible to input the explanatory information. The input explanatory information is displayed on the LCD 13. A explanation input window H4 shown by (J) of FIG. 7 represents a case in which "KEY IN" is input as explanatory information in a comment area N. On the explanation input window H4 shown by (J) of FIG. 7, the key data "1" of the operated key is displayed in the guide area GK. In a display area Kn which is adjacent to the guide area GK, the sequential index 1 corresponding to the operated key is displayed as "001".

When the user operates the execution key 12f, operational information including key data input with the key operation, input explanatory information, and a set display position of the guide area GK are stored in the second guidance memory 19E as guidance information. The operational information may include a sequential index corresponding to the operated key. Thereafter, a process according to the operation is executed.

The above process allows the user of the graphing calculator 10A (teacher) to input a single item of explanatory information for operational information of an operation of a key. The operational information of the operation of the operated key and explanatory information of the operational information are stored as guidance information in the second guidance memory 19E. The guidance information can be stored into the guide file f1.

Thereafter, the display of the LCD 13 returns to the guidance information generation window H1.

In the case where the LCD 13 is displaying the window H2', when the teacher operates the function key F6, the display of the LCD 13 is restored to the guidance information generation window H1.

In the case where the explanation input window H4 is being displayed on the LCD 13, when the teacher operates the EXIT key, merely the operational information and the set display position of the guide area GK is stored in the second guidance memory 19E as guidance information. Explanatory information will not be stored in the second guidance memory 19E. Then, a process according to the key operation is executed.

As described above, guidance information to be stored in a guide file is generated in one of the [n key] mode, the [AUTO] mode, and the [1 key] mode. Guidance information generated in the [n key] mode or the [1 key] mode is manually reproduced and guidance information generated in the [AUTO] mode is automatically reproduced in the graphing calculator 10B which is used by the student.

In the present embodiment, a plurality of items of guidance information can be generated in such a manner, for example, that first guidance information is generated in the [n key] mode and thereafter second guidance information is generated in the [1 key] mode. The first and second guidance information can be stored in one guide file. For example, as described above, when the numeral keys "1", "2", "3", and "4" are sequentially operated, operational information including key data of the keys and corresponding guidance information are stored in the objective guide file f1 as the first guidance information. Then, when a symbol key "+" is operated and explanatory information "PLUS" is input, the second guidance information is generated including operational information of the "PLUS" key and the input explanatory information "PLUS". The second guidance information is also stored in the objective guide file f1. Since the largest sequential index in the first guidance information is 4, the subsequent sequential index 5 is related to the key data of the "+" key. The second guidance information may include operational information having the key data of the symbol key "+" and corresponding sequential index 5.

Alternatively, the guidance information process (see FIG. 6) may be activated when any of created guide files is designated and processing with respect to any guidance information contained in the designated guide file is instructed. In this case, the display of the LCD 13 is switched to display a guidance information process window H as shown in (A) of FIG. 8 or (A) of FIG. 9. In the guidance information process window H, displayed are indicators such as [1 key], [EDIT], [END], [PLAY], [NEXT], and the like, as shown in illustration. For each indicator, a corresponding function key is set. In this case, the designated guide file is referred to as the objective guide file f1 and the guidance information to which the processing is instructed is referred to as objective guidance information.

Figure 8:
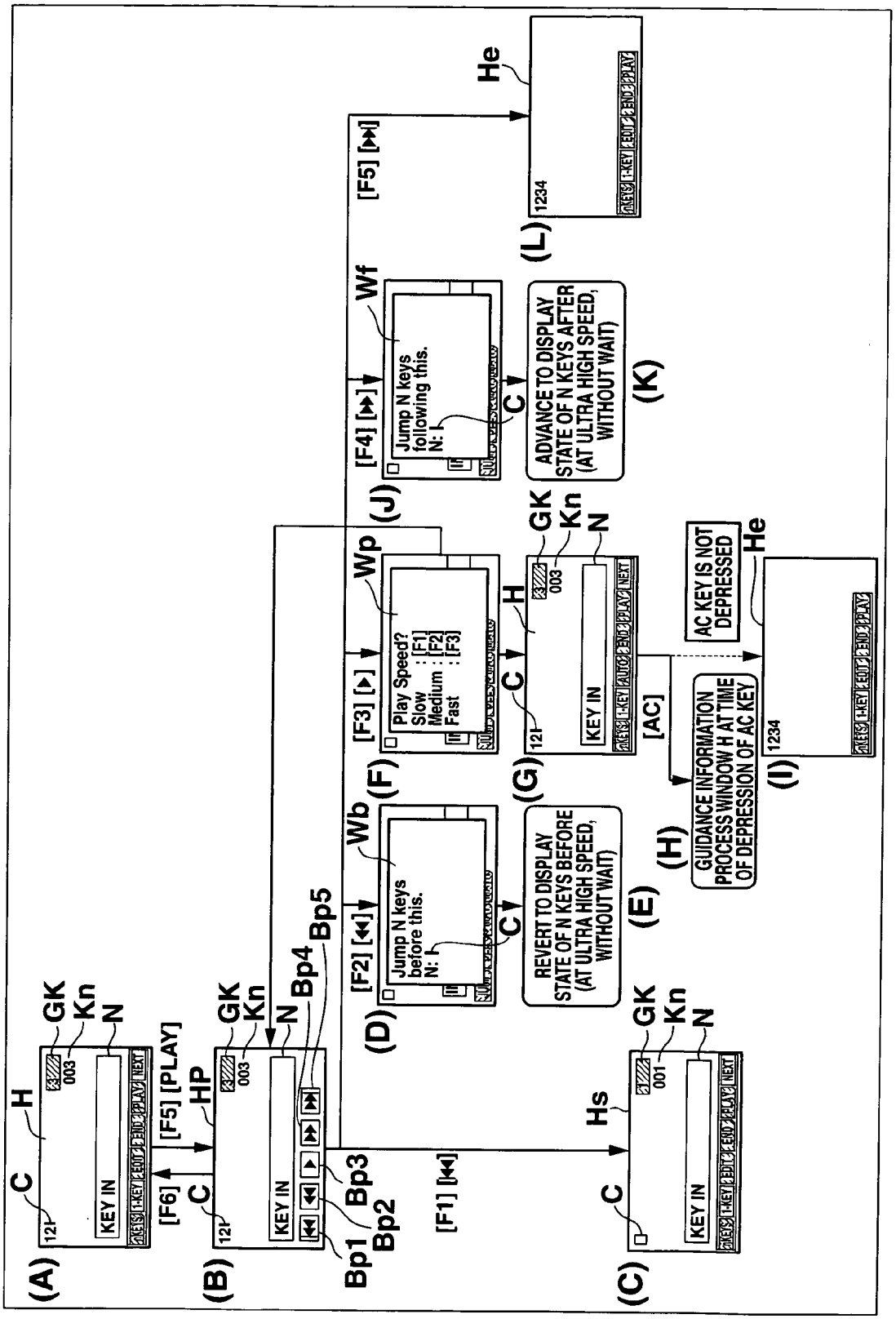
FIG. 8 is a view showing another example of display transition which accompanies the guidance information process according to the first embodiment.
Figure 9:
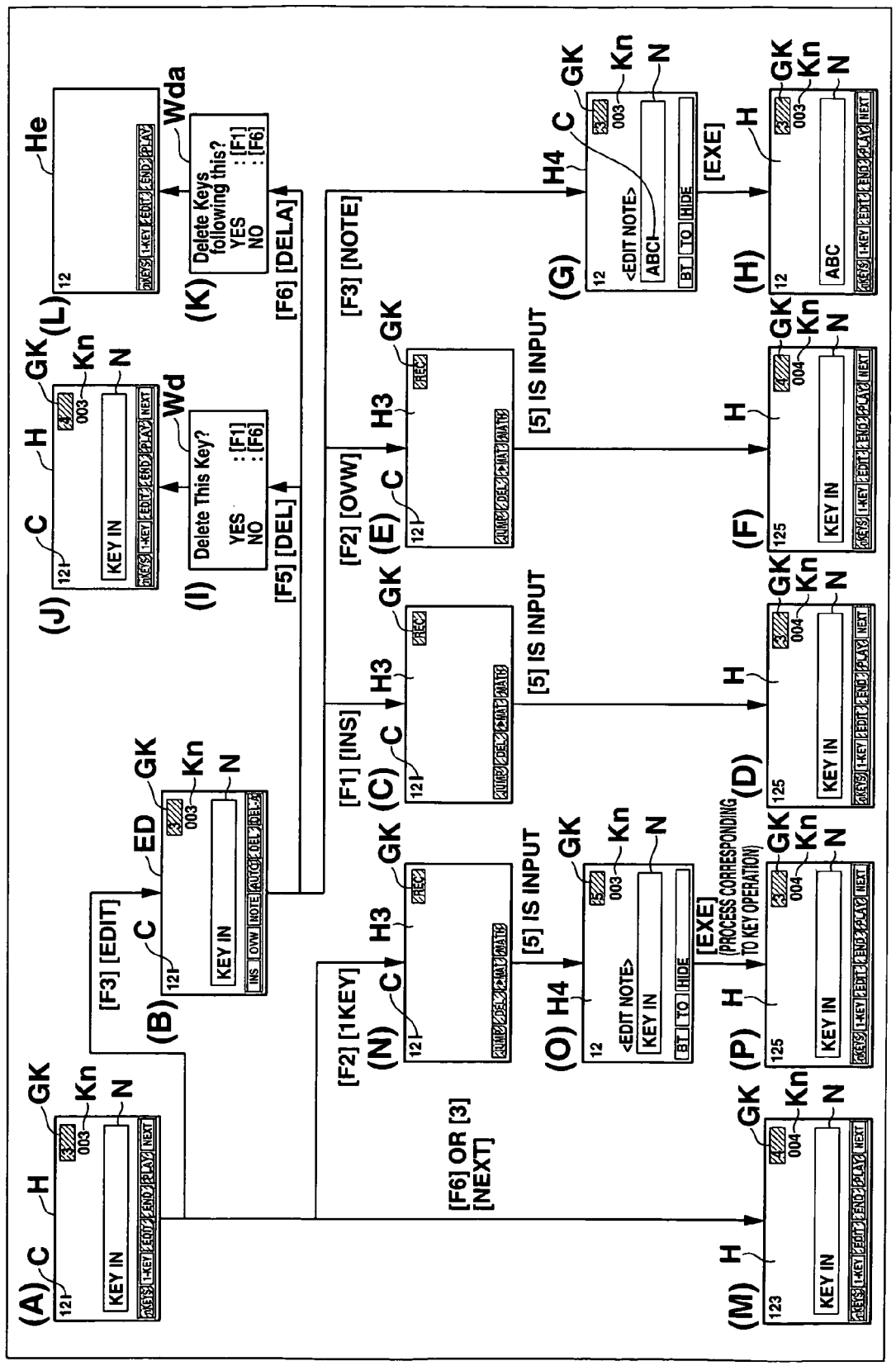
FIG. 9 is a view showing still another example of display transition which accompanies the guidance information process according to the first embodiment.

For example, (A) of FIG. 8 and (A) of FIG. 9 show the display of the LCD 13, which is reproducing guidance information (objective guidance information) generated in [n key] mode. The objective guidance information includes operational information generated from sequential operations to the numeral keys "1", "2", "3", and "4" and corresponding explanatory information "KEY IN". The guidance information process window H indicated by (A) of FIG. 8 or 9 displays key data "1" corresponding to the sequential index 1, and key data "2" corresponding to the sequential index 2. Furthermore, subsequent sequential index 3 is displayed in the display area Kn as "003", and corresponding key data "3" is displayed in the guide area GK. It should be noted that information of the display position of the guide area GK is preliminary included in the objective guidance information.

In either display state indicated by (A) of FIG. 8 or (A) of FIG. 9, when a function key corresponding to the indicator of [PLAY] is depressed ([PLAY] in step P1 of FIG. 6), a [PLAY] mode to be described later is set and guidance information included in the objective guide file f1 is reproduced (step P5 in FIG. 6). When the objective guide file f1 does not include any guidance information, nothing is executed in response to the depression of the function key corresponding to the indicator of [PLAY] and the display state of the LCD 13 does not change. When a function key corresponding to the indicator of [EDIT] is depressed in either display state indicated by (A) of FIG. 8 or (A) of FIG. 9 ([EDIT] in step P1 of FIG. 6), an [EDIT] mode to be described later is set to edit objective guidance information included in the objective guide file f1 (step P6 in FIG. 6).

When a function key corresponding to the indicator of [END] is depressed ([END] in step P1 of FIG. 6), a termination setting of the objective guide file f1 is configured (step P7 in FIG. 6).

Hereinafter, a reproduction process of guidance information in the [PLAY] mode will be described. When the function key corresponding to the indicator of [PLAY] is depressed while the guidance information process window H is being displayed on the LCD 13, the [PLAY] mode is set. In the [PLAY] mode, guidance information (objective guidance information) contained in the objective guide file f1 is reproduced. That is, key data included in the objective guidance information is displayed on the LCD 13 in order of sequential index, and corresponding explanatory information is also displayed on the LCD 13.

When the [PLAY] mode is set, the LCD 13 displays a window HP indicated by (B) of FIG. 8, for example. At the bottom area of the window HP, indicators Bp1 to Bp5 are displayed. The respective indicators Bp1 to Bp5 correspond to the function keys F1 to F5. When the user operates one of the function keys in reference to the indicators Bp1 to Bp5, the display state of the LCD 13 is switched in response to the key operation.

When the function key F1 corresponding to an indicator Bp1 is depressed, the display of the LCD 13 changes to the display window Hs which displays key data corresponding to the sequential index 1 in the guide area GK (e.g., (C) of FIG. 8).

When the function key F2 corresponding to an indicator Bp2 is depressed, a window Wb is displayed on the LCD 13 (see (D) of FIG. 8). The user (teacher) may input arbitrary numeric N into a position designated by a cursor C. When the numeric N is input, a sequential index is calculated by subtracting the N from the sequential index which is corresponding to the key data being displayed in the guide area GK. Then, key data corresponding to the calculated sequential index is displayed in the guide area GK. Namely, the display reverts back to the display state of N keys before. After the display reverts, key data contained in the objective guide file f1 is reproduced in order of sequential index from the key data corresponding to the calculated sequential index (see (E) of FIG. 8).

When the input numeric N is larger than the sequential index of the key data being displayed in the guide area GK, key data corresponding to the sequential index 1 comes to be displayed in the guide area GK (window Hs indicated by (C) of FIG. 8).

When the function key F3 corresponding to an indicator Bp3 is depressed, a window Wp is displayed on the LCD 13 (see (F) of FIG. 8). The teacher can select a speed for reproducing the key data contained in the objective guide file f1 from speeds displayed in the window Wp. The teacher may select a reproducing speed from a low speed (corresponding to the function key F1), a medium speed (corresponding to the function key F2), and a high speed (corresponding to the function key F3). Then reproduction of guidance information included in the objective guide file f1 is executed at the selected reproducing speed. That is, key data and corresponding explanatory information contained in the objective guide file f1 are reproduced at the selected reproducing speed in order of sequential index. When the teacher depresses the AC key during the reproduction, the reproduction is discontinued. On the LCD 13 displayed is a window corresponding to key data which is being displayed in the guide area GK at the time of the depression of the AC key ((H) of FIG. 8). In the case in which the AC key is not depressed, the reproduction is continued until reproduction of all key data contained in the objective guide file f1 is finished ((I) of FIG. 8).

In the case where guidance information has been generated in the [AUTO] mode and the reproducing speed has already been set, the reproduction of the guidance information may be performed at the reproducing speed set at the time of generation regardless of the speed selected from the window Wp. Alternatively, regardless of the reproducing speed set at the time of generation, the reproduction of the guidance information may be performed at the speed selected from the window Wp.

When the function key F4 corresponding to an indicator Bp4 is depressed, a window Wf is displayed on the LCD 13 (see (J) of FIG. 8). The user (teacher) may input arbitrary numeric N into a position designated by the cursor C. When the numeric N is input, a sequential index is calculated by adding the N to the sequential index which is corresponding to the key data being displayed in the guide area GK. Then, key data corresponding to the calculated sequential index is displayed in the guide area GK. Namely, the display advances to the display state of N keys after. After the display advances, key data contained in the objective guide file f1 is reproduced in order of sequential index from the key data corresponding to the calculated sequential index ((K) of FIG. 8).

When the calculated sequential index is larger than the maximum sequential index contained in the objective guide file f1, key data corresponding to the maximum sequential index comes to be displayed in the guide area GK (window He indicated by (I) and (L) of FIG. 8).

When the function key F5 corresponding to an indicator Bp5 is operated, the display of the LCD 13 changes to the display window He which displays key data corresponding to the maximum sequential index of the objective guide file f1 in the guide area GK (e.g., (L) of FIG. 8).

The above process allows the user of the graphing calculator 10A (teacher) to reproduce and confirm operational information and explanatory information included in the objective guide file f1. The speed for reproducing or the sequential index from which the reproduction starts may be arbitrarily set.

The following is description of an editorial process of guidance information executed in the [EDIT] mode.

When the function key corresponding to the indicator of [EDIT] is depressed while the guidance information process window H (e.g., (A) of FIG. 9) is being displayed on the LCD 13, the [EDIT] mode is set. When the [EDIT] mode is set, the LCD 13 displays a window ED as shown by (B) of FIG. 9, for example. The window ED shows the sequential index 3 displayed in the display area Kn as "003" similarly to the window H indicated by (A) of FIG. 9. Moreover, key data of "3" corresponding to the sequential index 3 is displayed in the guide area GK. In the bottom area of the window ED, indicators such as [INS], [OVW], [NOTE], [DEL], [DEL A], and the like are displayed. For each indicator, a corresponding function key is set.

When a function key corresponding to the indicator of [INS] is depressed, an [INS] mode is set. The [INS] mode is a mode for relating new key data to a sequential index indicated by the cursor C. When a function key corresponding to the indicator of [OVW] is depressed, an [OVW] mode is set. The [OVW] mode is a mode for overwriting key data corresponding to a sequential index indicated by the cursor C. The [INS] mode and the [OVW] mode are recording (REC) modes for editing operational information.

When a function key corresponding to the indicator of [NOTE] is depressed, a [NOTE] mode is set. The [NOTE] mode is a mode for rewriting explanatory information corresponding to the sequential index indicated by the cursor C.

When a function key corresponding to the indicator of [DEL] is depressed, a [DEL] mode is set. In the [DEL] mode, key data corresponding to the sequential index indicated by the cursor C is deleted. When a function key corresponding to the indicator of [DEL A] is depressed, a [DEL A] mode is set. In the [DEL A] mode, key data, which is corresponding to all the sequential indexes after the sequential index indicated by the cursor C, is deleted.

Subsequently, the [INS] mode will be described. When the [INS] mode is set, the LCD 13 displays a key input window H3 as indicated by (C) in FIG. 9. Since the [INS] mode is one of the recording modes, "REC" is displayed on the guide area GK to indicate the present mode.

When the user depresses a numeral key of "5", key data of the numeral key "5" is input. The input key data is associated with the sequential index 3 which is indicated by the cursor C, while keys corresponding originally to sequential indexes 3 or later are newly associated with incremented sequential indexes 4 or later. The LCD 13 comes to display the guidance information process window H shown by (D) of FIG. 9. The window H displays key data of numeral keys "1", "2", and "5" corresponding to the sequential indexes 1 to 3, and subsequent sequential index "004" is displayed in the display area Kn. Key data "3" corresponding to the sequential index 4 is shown in the guide area GK.

In the [INS] mode, it is thus possible to add new key data into operational information included in the objective guidance information.

Next, the [OVW] mode will be described. When the [OVW] mode is set, the LCD 13 displays the key input window H3 as indicated by (E) in FIG. 9. Since the [OVW] mode is one of the recording modes, "REC" is displayed on the guide area GK to indicate the present mode.

When the user depresses the numeral key "5", key data of the numeral key "5" is input. The input key data is associated with the sequential index 3 which is indicated by the cursor C, while key data originally associated with the sequential index 3 is deleted from the objective guidance information. Further, there is no change with respect to key data corresponding to subsequent sequential indexes (4 or later). The display of the LCD 13 changes to the guidance information process window H indicated by (F) of FIG. 9. In the window H, key data of numeral keys "1", "2", and "5" corresponding to the sequential indexes 1 to 3 are displayed, and subsequent sequential index "004" is displayed in the display area Kn. Key data "4" corresponding to the sequential index 4 is shown in the guide area GK.

In the [OVW] mode, it is thus possible to overwrite key data included in the objective guidance information.

The following is description of the [NOTE] mode. When the [NOTE] mode is set, the LCD 13 displays an explanation input window H4 as indicated by (G) in FIG. 9. The explanation input window H4 includes a comment area N. The window H4 of (G) in FIG. 9 shows the display state of the case in which the teacher has newly input explanatory information "ABC" in the comment area N.

When the teacher depressed the execution key 12f, the newly input explanatory information is registered in the objective guidance information. The LCD 13 displays the guidance information process window H indicated by (H) of FIG. 9. In the window H, the explanatory information is rewritten from "KEY IN" to "ABC".

Therefore, it is thus possible to rewrite explanatory information included in the objective guidance information in the [NOTE] mode.

Subsequently, the [DEL] mode will be described. When the [DEL] mode is set, the LCD 13 displays a window Wd shown in (I) of FIG. 9. Window Wd is displayed to ask the user (teacher) for permission to delete key data corresponding to the sequential index indicated by the cursor C. The teacher operates the function key F1 to permit the deletion, or operates the function key F6 to disallow the deletion. When the deletion is permitted with depression of the function key F1 by the teacher, the key data is deleted from the objective guidance information. The LCD 13 shows the guidance information process window H indicated by (J) of FIG. 9. In this case, key data "3" corresponding to the sequential index 3 which is indicted by the cursor C is deleted, and sequential index corresponding to key data "4", which is originally 4, moves up to 3. Thereby, on the window H indicated by (J) of FIG. 9, sequential index 3 is displayed in the display area Kn as "003", and the key data "4" which is associated with the sequential index 3 is displayed in the guide area GK.

In the [DEL] mode, it is thus possible to delete key data from the objective guidance information.

Hereinafter, the [DEL A] mode will be described. When the [DEL A] mode is set, the LCD 13 displays a window Wda shown in (K) of FIG. 9. Window Wda is displayed to ask the user (teacher) for permission to delete key data corresponding to the sequential index indicated by the cursor C and subsequent sequential indexes. The teacher operates the function key F1 to permit the deletion, or operates the function key F6 to disallow the deletion. When the deletion is permitted with depression of the function key F1 by the teacher, the key data is deleted from the objective guidance information. Explanatory information corresponding to the deleted key data is also deleted. The LCD 13 displays the guidance information process window H indicated by (L) of FIG. 9.

Therefore, it is thus possible to delete key data of plurality of keys from the objective guidance information in the [DEL A] mode.

Then, described hereinafter is operation executed when the function key corresponding to the indicator of [1 key] is depressed ([1 key] in step P1 of FIG. 6) while the guidance information process window H indicated by (A) of FIG. 9 is being displayed on the LCD 13. When the function key corresponding to the indicator of [1 key] is depressed while the guidance information process window H shown in (A) of FIG. 9 is being displayed on the LCD 13, the [1 key] mode is set to generate guidance information (step P4 in FIG. 6).

When the [1 key] mode is set, the LCD 13 displays a key input window H3 indicated by (N) of FIG. 9, for example. Since the presently set [1 key] mode is one of the recording modes, "REC" is displayed on the guide area GK to indicate the present mode. The cursor C indicates a position into which key data corresponding to sequential index 3 is input.

The teacher operates one key to input key data of the key, and inputs corresponding explanatory information. The explanation input window H4 indicated by (0) in FIG. 9 shows the case in which key data of numeral key "5" is input to be related to the sequential index 3, and "KEY IN" is input in the comment area N as explanatory information.

When the user operates the execution key 12f, the input explanatory information and the operational information including key data input by the teacher are stored as guidance information. The input key data is related to the sequential index 3 indicated by the cursor C while keys corresponding originally to sequential indexes 3 or later are newly associated with incremented sequential indexes 4 or later. The LCD 13 comes to display the guidance information process window H indicated by (P) of FIG. 9. The window H shows key data of numeral keys "1", "2", and "5" corresponding to the sequential indexes 1 to 3, and subsequent sequential index "004" is displayed in the display area Kn. Key data "3" corresponding to the sequential index 4 is shown in the guide area GK.

The objective guidance file f1 ends up storing the following three items of guidance information. That is, first guidance information including first operational information, which contains key data of the numeral keys "1" and "2", and corresponding first explanatory information of "KEY IN"; second guidance information including second operational information, which contains key data of the numeral key "5", and corresponding second explanatory information "KEY IN"; and third guidance information including third operational information, which contains key data of the numeral keys "3" and "4", and corresponding third explanatory information "KEY IN". The key data of the numeral keys "1" and "2" correspond to the sequential indexes 1 and 2, and the key data of the numeral key "5" corresponds to the sequential index 3. Moreover, the key data of the numeral keys "3" and "4" correspond to the sequential indexes 4 and 5.

Therefore, other guidance information can be inserted into the objective guidance information in the [1 key] mode.

Furthermore, in the case where the guidance information process window H indicated by (A) of FIG. 9 is being displayed on the LCD 13, when the function key corresponding to the indicator of [NEXT] is depressed or when key data "3" corresponding to the sequential index indicated by the cursor C is input, the LCD 13 displays a guidance information process window H as indicated by (M) of FIG. 9. The window H shows key data of numeral keys "1", "2", and "3" corresponding to the sequential indexes 1 to 3, and subsequent sequential index "004" is displayed in the display area Kn. Key data "4" corresponding to the sequential index 4 is shown in the guide area GK. Namely, the display advances to the display state of one key operation after by operating the function key corresponding to the indicator [NEXT] or inputting key data corresponding to the sequential index indicated by the cursor C.

Subsequently, configuring the termination setting of the objective guide file f1 will be described (step P7 in FIG. 6). When a function key corresponding to the indicator of [END] is depressed ([END] in step P1 of FIG. 6) while the guidance information generation window H1 (such as (A) of FIG. 7 or (A) of FIG. 10) or the guidance information process window H1 (such as (A) of FIG. 8, (A) of FIG. 9, or (B) of FIG. 10) is being displayed on the LCD 13, configuring the terminating setting of the guide file is started.

Figure 10:
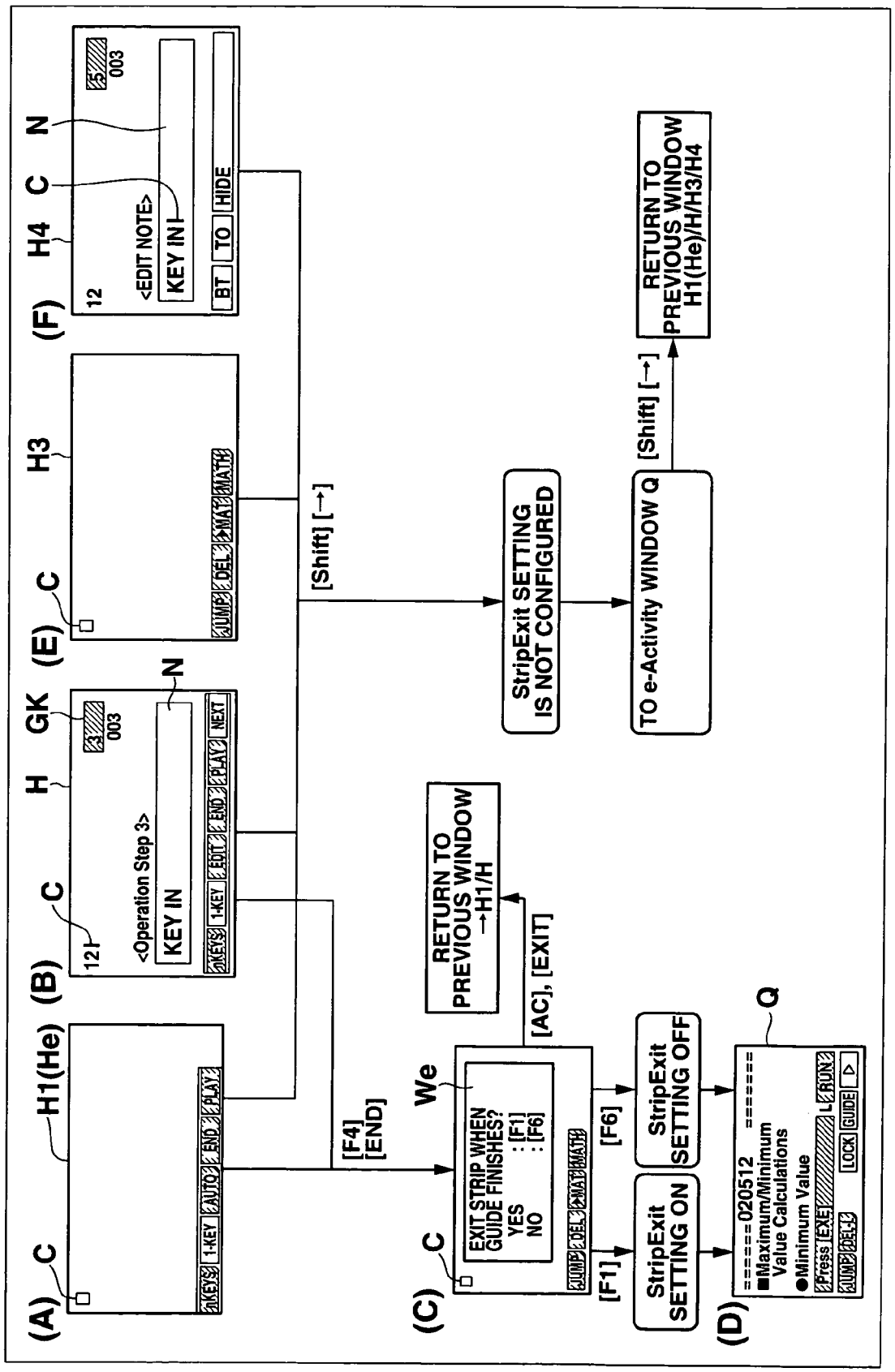
FIG. 10 is a view showing a further example of display transition which accompanies the guidance information process according to the first embodiment.

When the function key corresponding to the indicator of [END] is depressed, the LCD 13 displays a window We shown in (C) of FIG. 10. The teacher selects, in reference to the display of the window We, termination setting of the objective guide file f1. The termination setting is configured for the case in which the objective guide file f1 is utilized in the graphing calculator 10B which the student uses. When the teacher has a intention that the LCD 13 of the calculator 10B displays an e-Activity window Q corresponding to the objective guide file f1 at the end of the utilization of the objective guidance file 1, the teacher operates the function key F1 ("Strip Exit" setting is set to "On"). On the other hand, when the teacher does not have such intention, the teacher operates the function key F6 ("Strip Exit" setting is set to "Off"). The data of the Strip Exit setting (On/Off) is stored in the return setting memory 19H.

Then, the LCD 13 of the graphing calculator 10A displays the e-Activity window Q corresponding to the objective guide file f1 as shown by (D) of FIG. 10.

When the teacher depresses the AC key or the EXIT key while the window We is being displayed on the LCD 13, the display of the LCD 13 is restored to the previous display state, i.e., the guidance information generation window H or the guidance information process window H1.

While the LCD 13 is displaying the guidance information generation window H1 indicated by (A) of FIG. 10, the guidance information process window H indicated by (B) of FIG. 10, the key input window H3 indicated by (E) of FIG. 10, or the explanation input window H4 indicated by (F) of FIG. 10, when the teacher depresses the shift key 12d and the cursor key "→" simultaneously or sequentially, the LCD 13 does not displays the window We but displays the e-Activity window Q. When the teacher again depresses the shift key 12d and the cursor key "→" simultaneously or sequentially while the e-Activity window Q is being displayed on the LCD 13, the display of the LCD 13 returns to the guidance information generation window H1, the guidance information process window H, the key input window H3, or the explanation input window H4.

As described above, a variety of information generated or edited in the guide file creation process (see FIG. 5) and the guidance information process (see FIG. 6) is stored into the predetermined storage areas prepared in the guide file memory 19S. Data of guide file stored in the guide file memory 19S will be stored as is into the external storage 19 (step T5 of FIG. 5, for example).

The external storage 16 containing the created guide file can be detached from the graphing calculator 10A and can be attached to the graphing calculator 10B (see FIG. 1). Consequently, the user of the graphing calculator 10B (student) can use the created guide file. Alternatively, the created guide file may be exchanged via the USB cable 18c.

Hereinafter, utilization of a guide file supplied to the graphing calculator 10B will be described. When the user designates utilization of the guide file provided from the graphing calculator 10A, a guide file learning process shown in FIG. 11 is activated.

Figure 11:
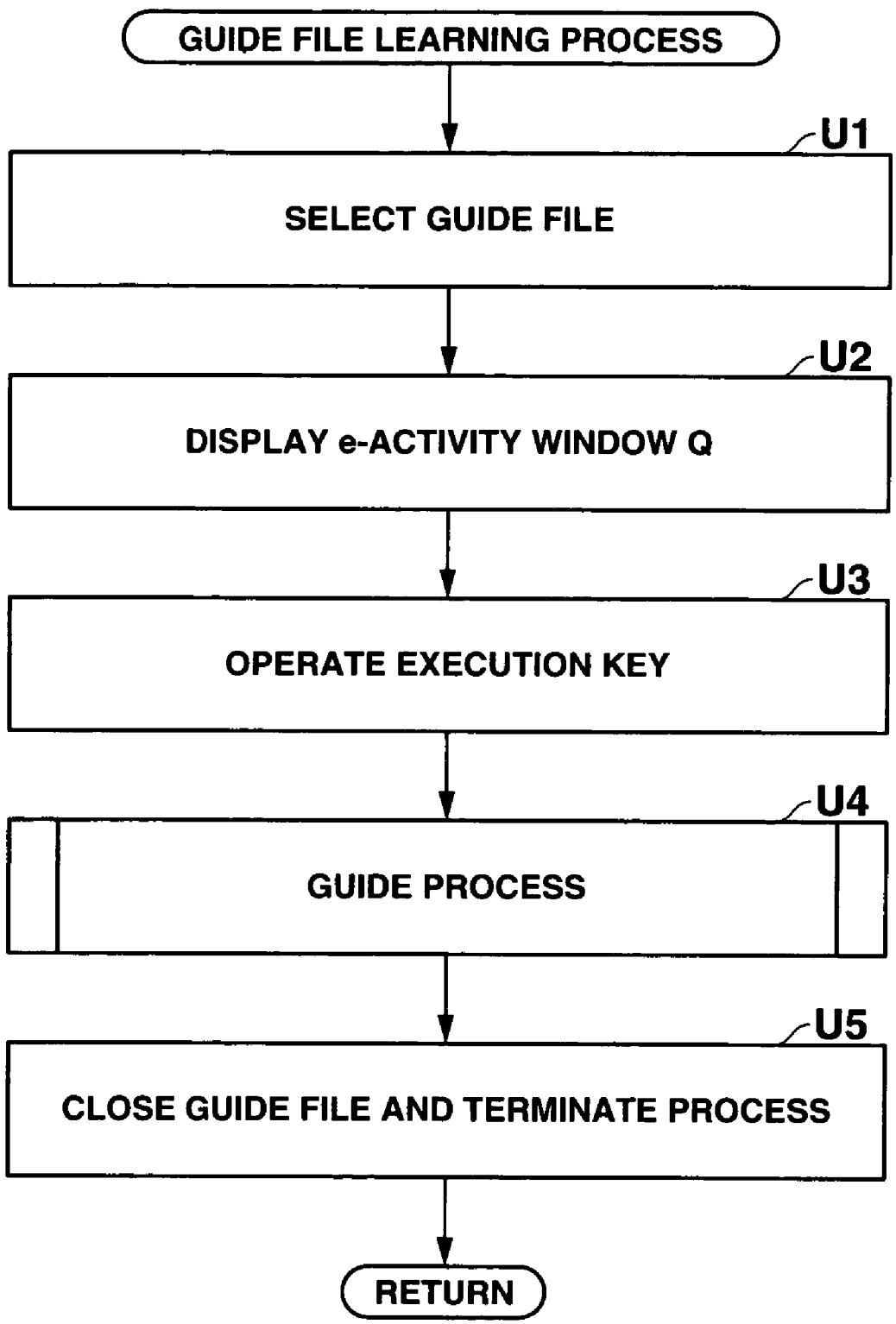
FIG. 11 is a flowchart of a guide file learning process according to the first embodiment.

FIG. 11 is a flowchart of the guide file learning process according to the present embodiment. The guide file learning process is a process in which the user of the graphing calculator 10B (student) studies using guidance information included in the guide file.

When the guide file learning process is activated, the user (student) selects a guide file (objective guide file f2) from one or more guide files supplied from the graphing calculator 10A (step U1). When the objective guide file f2 is selected, the LCD 13 of the graphing calculator 10B displays an e-Activity window Q corresponding to the objective guide file f2 (step U2). An example of the e-Activity window Q displayed on the LCD 13 is shown by (A) of FIG. 12. In the e-Activity window Q, a strip button SB containing two items of "Minimum Value" and "RUN" is displayed.

When the user (student) operates the execution key 12f (step U3), the after-mentioned guide process is executed based on guidance information included in the objective guide file f2 (step U4). After the learning using the objective guide file f2 is finished, the objective guide file f2 is closed and the guide file learning process terminates (step U5).

Subsequently described is the guide process executed in the graphing calculator 10B based on guidance information included in the objective guide file f2.

Figure 12:
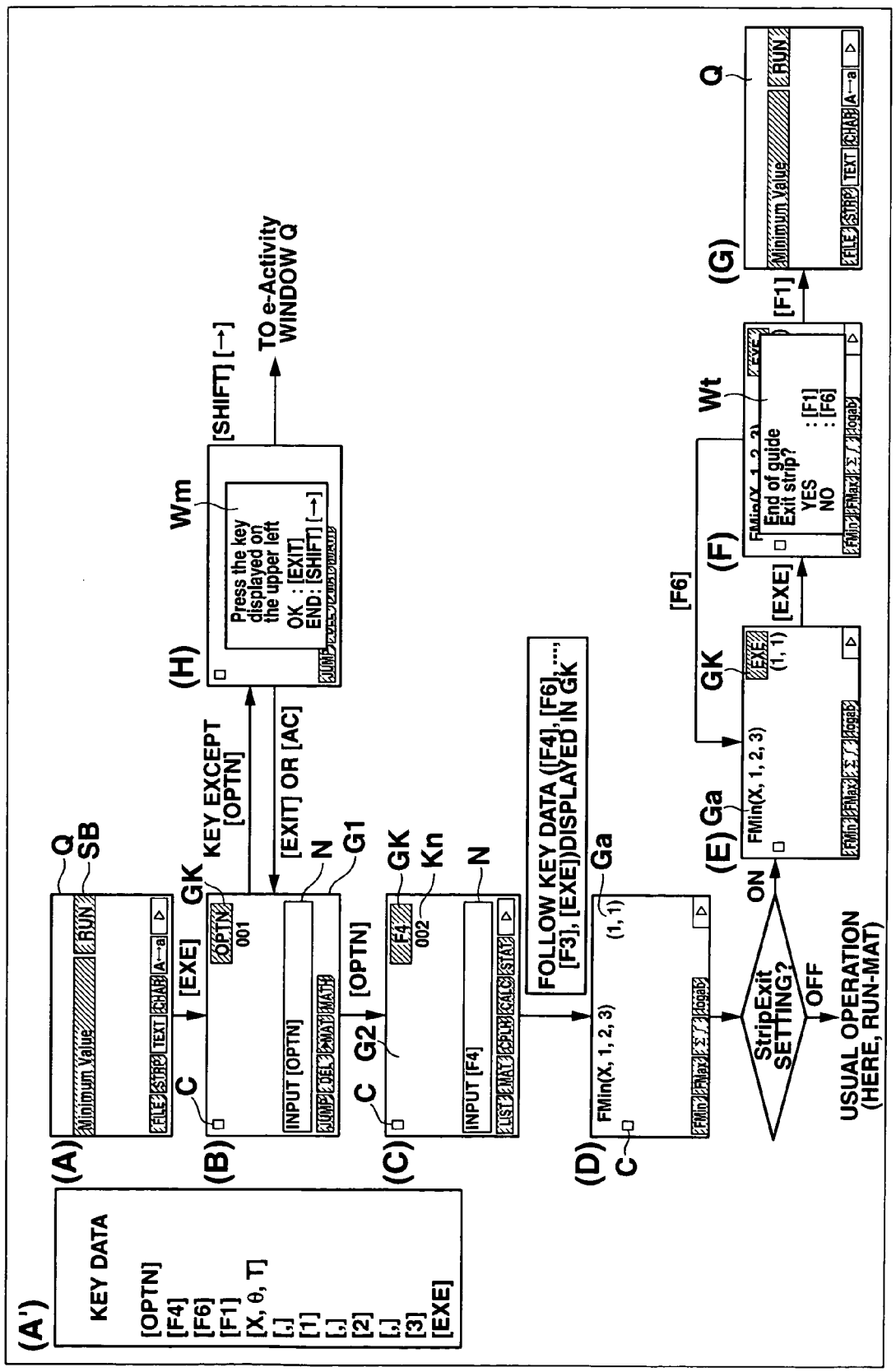
FIG. 12 is a view showing an example of display transition which accompanies the guide file learning process according to the first embodiment.

FIG. 12 is a view showing an example of display transition of the LCD 13 which accompanies the guide process. The objective guide file f2, which is to be explained with respect to FIG. 12, includes key data of twelve keys [OPTN], [F4], [F6], [F1], [X, θ, T], [,], [1], [,], [2], [,], [3], [EXE] (see (A') of FIG. 12). The respective keys correspond to sequential indexes 1 to 12. The objective guide file f2 includes first to twelfth guidance information which is generated in the [1 key] mode. The first guidance information includes key data [OPTN] as operational information and corresponding explanatory information "INPUT [OPTN]". Similarly, the second guidance information includes key data [F4] as operational information and includes explanatory information "INPUT [F4]". The third guidance information includes key data [F6] as operational information and includes explanatory information "INPUT [F6]". The fourth guidance information includes key data [F1] as operational information. The fifth guidance information includes key data [X, θ, T] as operational information, and the sixth guidance information includes key data [,] as operational information. The seventh guidance information includes key data [1], and the eighth guidance information includes key data [,]. Also, the ninth guidance information includes key data [2] as operational information, and the tenth guidance information includes key data [,] as operational information. Moreover, the eleventh guidance information includes key data [3] as operational information. Furthermore, the twelfth guidance information includes key data [EXE] as operational information and includes explanatory information "INPUT [EXE]".

When the student operates the execution key 12f to start the guide process, the LCD 13 displays a guidance window G1 as shown by (B) of FIG. 12. On the guidance window G1, the key data [OPTN] of the option key 12e which is corresponding to the sequential index 1 and should be operated firstly is displayed in the guide area GK. In the display area Kn which is adjacent to the guide area GK, the sequential index 1 is displayed as "001". In the comment area N shown is the explanatory information "INPUT [OPTN]" corresponding to the key data.

When the user operates the option key 12e by reference to the guidance window G1, the LCD 13 displays the guidance window G2 indicated by (c) of FIG. 12. The key data [F4] of the function key F4 which is corresponding to the sequential index 2 and should be operated subsequent to the option key 12e is displayed in the guide area GK. In the display area Kn, the sequential index 2 is displayed as "002". The explanatory information "INPUT [F4]" corresponding to the key data is displayed in the comment area N.

When the student operates the function key F4 by reference to the guidance window G2, the LCD 13 displays a guidance window G3. The subsequent sequential index 3 is displayed as "003" in the display area Kn of the guidance window G3, and the key data [F6] of the key corresponding to the sequential index 3 is displayed in the guide area GK. The explanatory information "INPUT [F6]" corresponding to the key data is displayed in the comment area N. Afterward, a guidance window G4, a guidance window G5, and thereafter are displayed in response to each key operation performed by the student.

Eventually, the LCD 13 displays a guidance window G12 corresponding to the sequential index 12. The sequential index 12 is displayed as "012" in the display area Kn of the guidance window G12, and the key data [EXE] of the key corresponding to the sequential index 12 is displayed in the guide area GK. The explanatory information "INPUT [EXE]" corresponding to the key data is displayed in the comment area N.

When the student operates the execution key 12f by reference to the guidance window G12, the control unit 11 executes a calculation process of "Minimum Value" in accordance with the above sequence of the key operations performed by the user. The control unit 11 stores a result of the calculation into the result data memory 19J.

The calculation result of the calculation process (FMin . . . ) is displayed on a result window indicated by (D) of FIG. 12. Therefore, the user of the graphing calculator 10B (student) can solve a problem merely by following the guide file provided by the teacher, even though the student is not enough familiarized with the operational procedure of the graphing calculator 10B.

Afterward, the control unit 11 determines whether the Strip Exit setting of the objective guide file f2 is set to "On" or not. When it is determined that the Strip Exit setting is set to "On", the LCD 12 displays a window Ga indicated by (E) of FIG. 12. The window Ga indicated by (E) of FIG. 12 shows "EXE" in the guide area GK. When the student depresses the execution key 12f by reference to the guide area GK, a window Wt is generated ((F) of FIG. 12). The window Wt is for confirming termination of the guide process. The student operates the function key F1 to terminate the guide process, or operates the function key F6 to disallow the termination. When the function key F1 is operated, the LCD 13 displays an initial e-Activity window Q of the objective guide file f2 as shown by (G) of FIG. 12. When the function key F6 is operated, the display of the LCD 13 returns to a previous state as indicated by (E) of FIG. 12.

When the control unit 11 determines that the "Strip Exit" setting is set to "Off", input state of the key data is maintained which is input by the student during the execution of the guide process. Thereafter, a usual operation which is not associated with the e-Activity learning becomes possible.

Regardless of the key data displayed in the guide area GK based on the guidance information as shown in (B) or (C) of FIG. 12, there may be a case in which the student operates a key different from the displayed key data. In such a case, a window Wm is displayed (e.g., the display of the LCD 13 changes from (B) of FIG. 12 to (H) of FIG. 12). When the student operates the EXIT key or the AC key, the display of the LCD 13 reverts to the previous state to continue the guide process. When the teacher depresses the shift key 12d and the cursor key "→" simultaneously or sequentially, the guide process is cancelled and the initial e-Activity window Q of the objective guide file f2 is displayed on the LCD 13.

After the learning by use of the objective guide file f2 is executed, the objective guide file f2 is closed and the guide file learning process terminates (step U5).

Subsequently, another example of the guide process executed in the graphing calculator 10B will be described.

Figure 13:
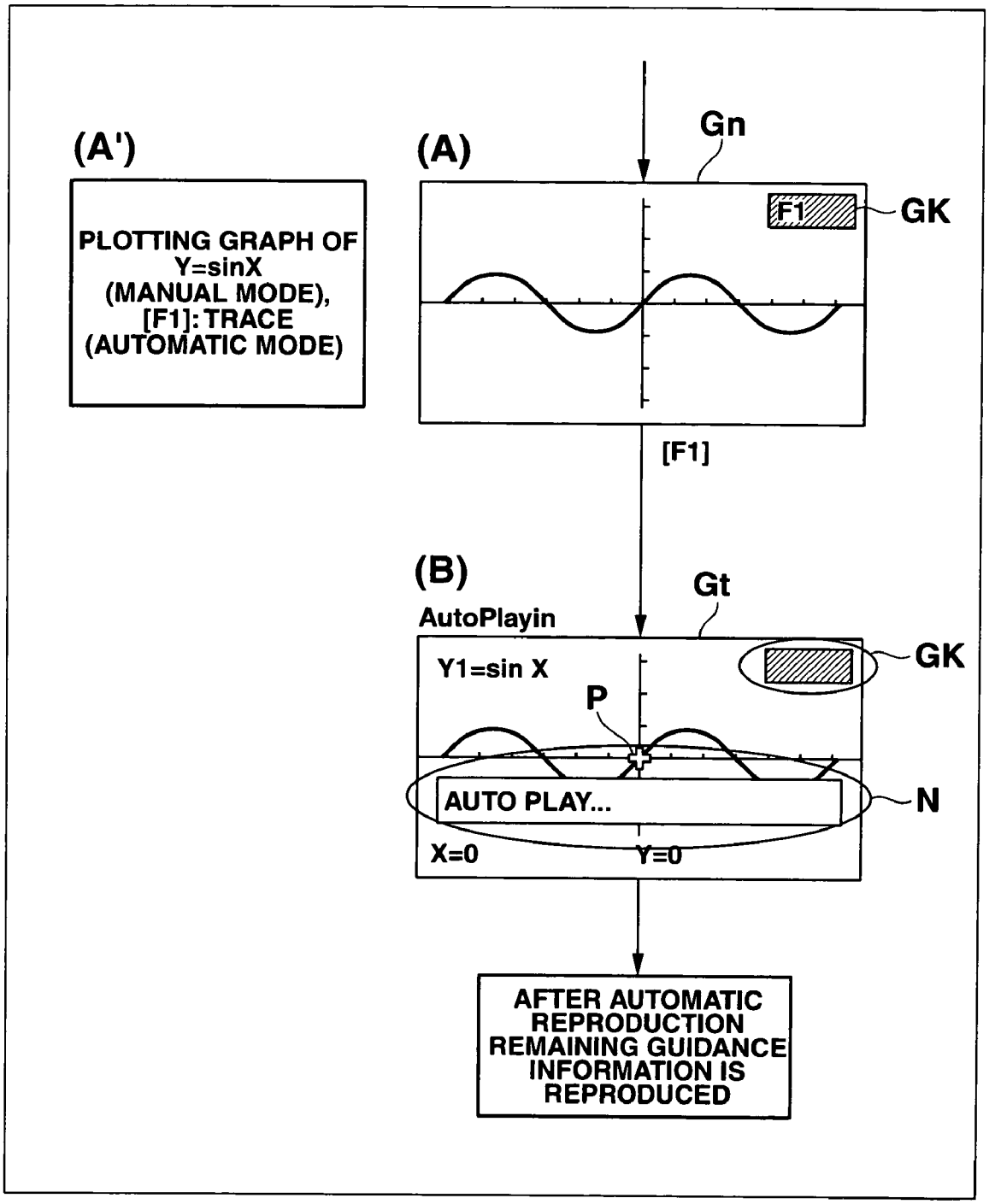
FIG. 13 is a view showing another example of display transition which accompanies the guide file learning process according to the first embodiment.

FIG. 13 is a view showing another example of display transition of the LCD 13 which accompanies the guide process. The objective guide file f2, which is to be explained with respect to FIG. 13, includes items of guidance information generated in the [1 key] mode and an item of guidance information subsequently generated in the [AUTO] mode (see (A') of FIG. 13). The items of the guidance information generated in the [1 key] mode includes operational information for plotting a graph of "Y=sin X" on the LCD 13 and corresponding explanatory information. The guidance information generated in the [AUTO] mode includes operational information for tracing the loci of the graph, and corresponding explanatory information.

In the guide process, the LCD 13 sequentially displays guidance windows to indicate the items of the guidance information generated in the [1 key] mode. The student sequentially input key data displayed in the guide area GK by reference to the guidance windows. Thereby, the LCD 13 displays a guidance window Gn in which the graph of the "Y=sin X" is plotted as shown in (A) of FIG. 13. When the student operates the function key F1 by reference to the display of the guide area GK in the guidance window Gn, the guidance information generated in the [AUTO] mode is automatically reproduced. Namely, key data included in the guidance information is automatically input and a guidance window Gt indicated by (B) of FIG. 13 shows a pointer P which is tracing the graph. The explanatory information included in the guidance information is displayed in the comment area N.

The automatic reproduction of the guidance information generated in the [AUTO] mode is performed at the speed set at the time of generating the guidance information. The teacher may set the reproduction speed in consideration of the level of operation proficiency of the student.

When there remains guidance information which is not reproduced upon termination of the automatic reproduction of the guidance information, the remaining guidance information is reproduced.

The guidance information may include guidance information for causing the student to actually operate keys, in combination with guidance information to be reproduced automatically. Therefore, the teacher may determine the combination in consideration of the level of the user.

The following is a description of still another example of the guide process executed in the graphing calculator 10B.

Figure 14:
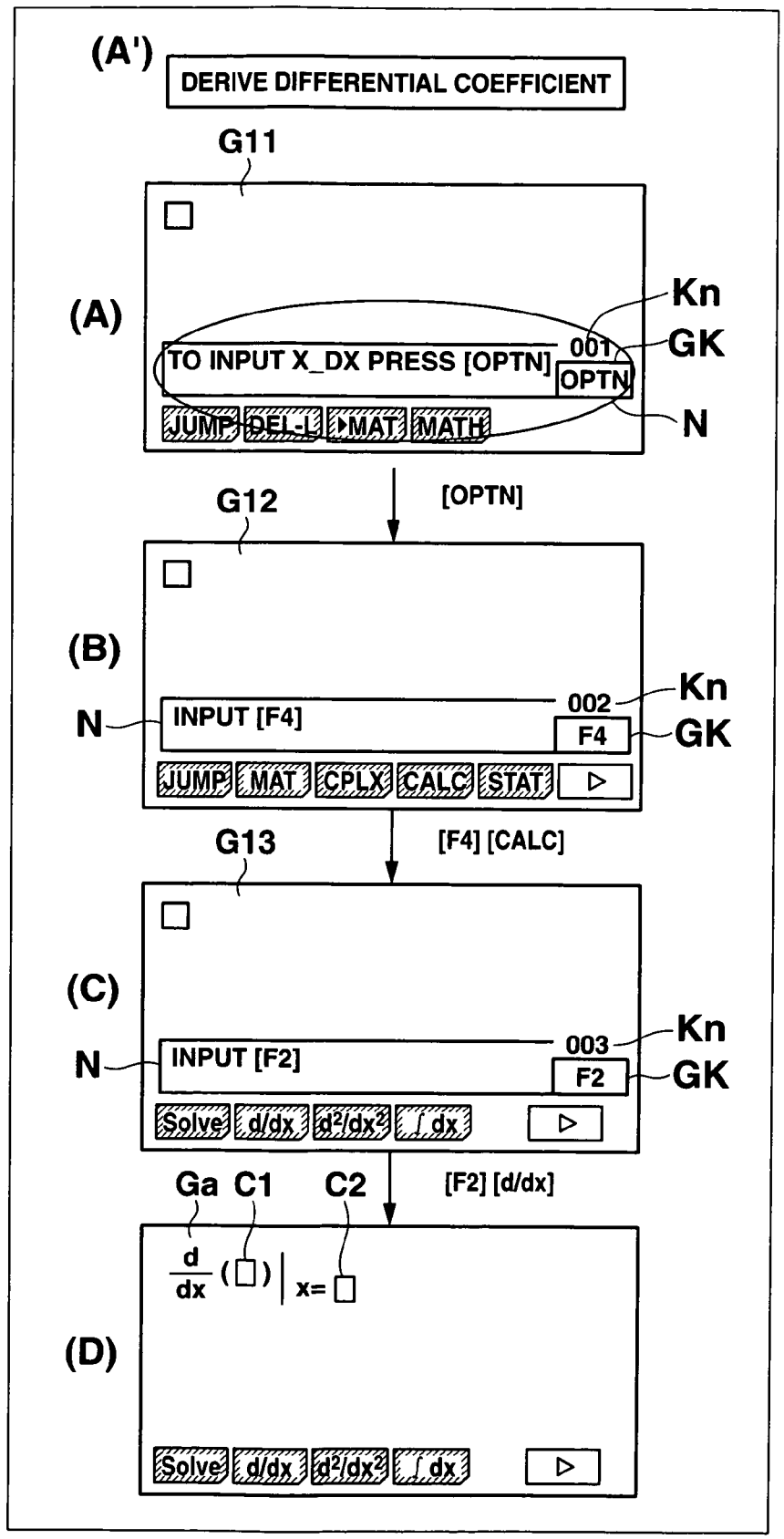
FIG. 14 is a view showing still another example of display transition which accompanies the guide file learning process according to the first embodiment.

FIG. 14 is a view showing still another example of display transition of the LCD 13 which accompanies the guide process. The objective guide file f2, which is to be explained with respect to FIG. 14, includes key data of three keys "OPTN", "F4", and "F2". The keys correspond to sequential indexes 1 to 3. That is, the objective guidance file f2 includes the first to the third items of guidance information generated in the [1 key] mode. The items of the guidance information, which are generated in the [1 key] mode, include operational information of key operation for deriving a differential coefficient.

In the guide process, the LCD 13 firstly displays a guidance window G11 as shown by (A) of FIG. 14. On the guidance window G11, the key data [OPTN] of the option key 12e which is corresponding to the sequential index 1 and should be operated firstly is displayed in the guide area GK. In the display area Kn which is adjacent to the guide area GK, the sequential index 1 is displayed as "001". The explanatory information of "INPUT [OPTN]" corresponding to the key data is shown in the comment area N. Moreover, the area GKd is set as the display area of the guide area GK.

When the student operates the option key 12e by reference to the guidance window G11, the LCD 13 displays the guidance window G12 indicated by (B) of FIG. 14. The key data [F4] of the function key F4 which is corresponding to the sequential index 2 and should be operated subsequent to the option key 12e is displayed in the guide area GK of the guidance window G12. In the display area Kn, the sequential index 2 is displayed as "002". The explanatory information "INPUT [F4]" corresponding to the key data is displayed in the comment area N.

When the student operates the function key F4 corresponding to the indicator of [CALC] (calculation) by reference to the guidance window G12, the LCD 13 displays the guidance window G13 indicated by (C) of FIG. 14. The key data [F2] corresponding to the sequential index 3 is displayed in the guide area GK of the guidance window G13. In the display area Kn, the sequential index 3 is displayed as "003". The explanatory information "INPUT [F2]" corresponding to the key data is displayed in the comment area N.

When the student operates the function key F2 corresponding to an indicator of "d/dx" by reference to the guidance window G13, the LCD 13 displays an input window Ga as indicated by (D) of FIG. 14. Two cursors C1 and C2 are displayed in the input window Ga. The student may arbitrarily input, in a position indicated by the cursor C1, a function from which it is desired to drive a differential coefficient. The student may input an arbitrary numeric in a position indicated by the cursor C2.

The student can readily perform operation for deriving a differential coefficient based on guidance information generated by the teacher.

As described above, by use of the graphing calculator 10 of the present embodiment, the teacher generates guidance information including operational information of key operation, which the teacher desires the student to perform, and corresponding explanatory information. The generated guidance information is stored in a guide file.

The generation of the guidance information is performed in an automatic mode ([auto] mode) or manual modes ([n key] mode and [1 key] mode). Guidance information generated in the automatic mode is automatically reproduced when the user utilizes the guidance information. Reproduction of guidance information generated in the manual mode requires the user to actually perform key operation. The guide file may include a plurality of items of guidance information. The plurality of items of guidance information is not necessarily generated in the same mode.

Other embodiments of the graphing calculation apparatus according to the present invention will be described. The same portions as those of the first embodiment will be indicated in the same reference numerals and their detailed description will be omitted.

Second Embodiment

An outer appearance and a block diagram of the graphing calculator 10 according to the present embodiment is same as the outer appearance and the block diagram of the graphing calculator 10 according to the first embodiment. Illustrating the outer appearance and the block diagram of the graphing calculator 10 according to the present embodiment is omitted.

Figure 15:
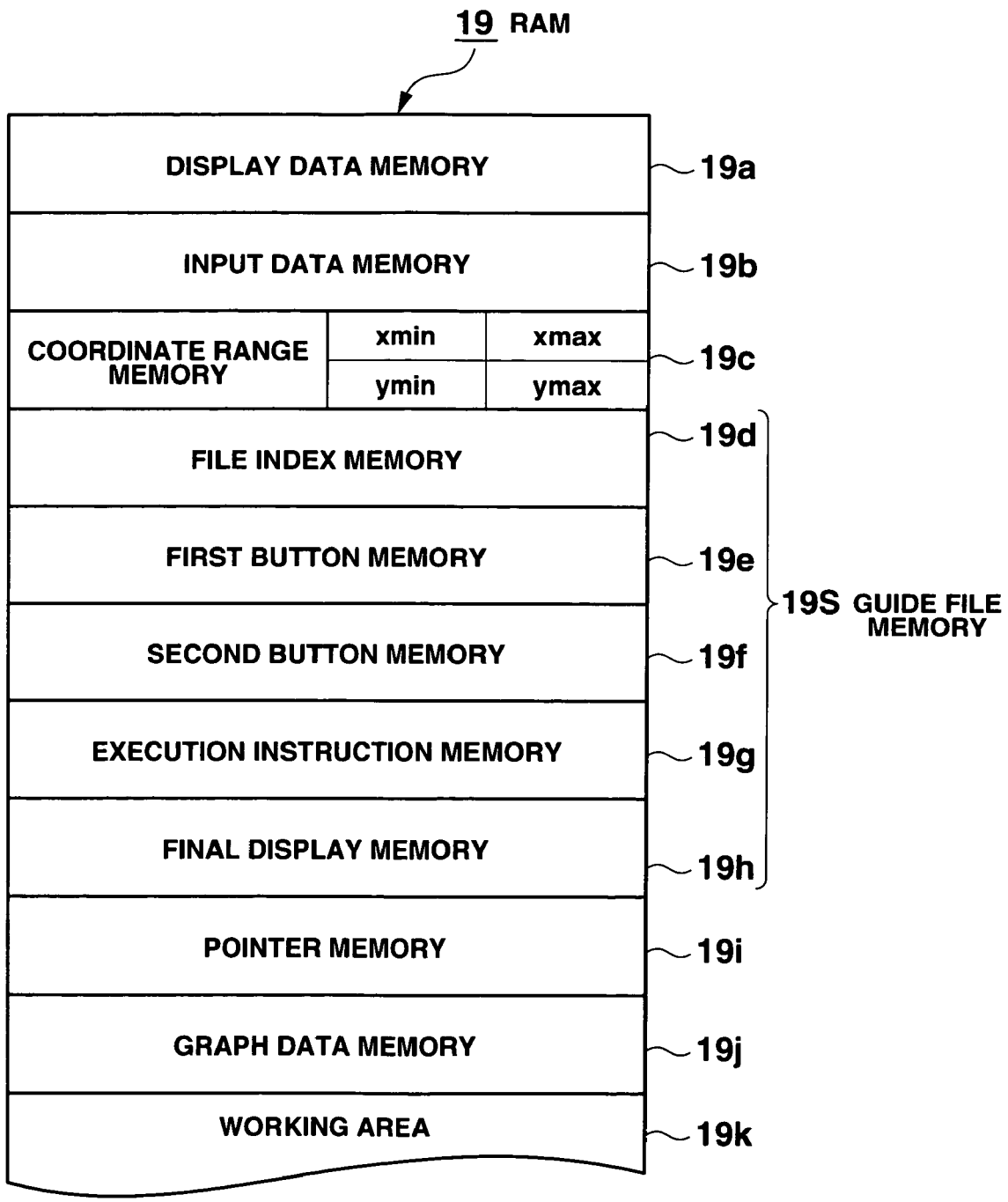
FIG. 15 is a view showing storage areas prepared in the RAM 19 according to a second embodiment.

FIG. 15 is a view showing storage areas prepared in the RAM 19 according to the present embodiment.

The RAM 19 includes storage areas such as a display data memory 19a, an input data memory 19b, a coordinate range memory 19c, a guide file memory 19S (including storages areas 19d to 19h), a pointer memory 19i, a graph data memory 19j, and a working area 19k.

The guide file memory 19S is utilized for executing the e-Activity learning. The guide file memory 19S can be divided into a file index memory 19d, a first button memory 19e, a second button memory 19f, an execution instruction memory 19g, and a final display memory 19h.

The display data memory 19a stores display data to be displayed on the LCD 13 in the form of bitmap. The input data memory 19b stores key input data of a numeral or a symbol input by operation of the key input unit 12. The coordinate range memory 19c stored coordinate data (Xmin, Xmax, Ymin, Ymax) which designates plot range for plotting a graph on the LCD 13.

The file index memory 19d stores identification data for a guide file (for example, file name F and item data T).

Figure 16:
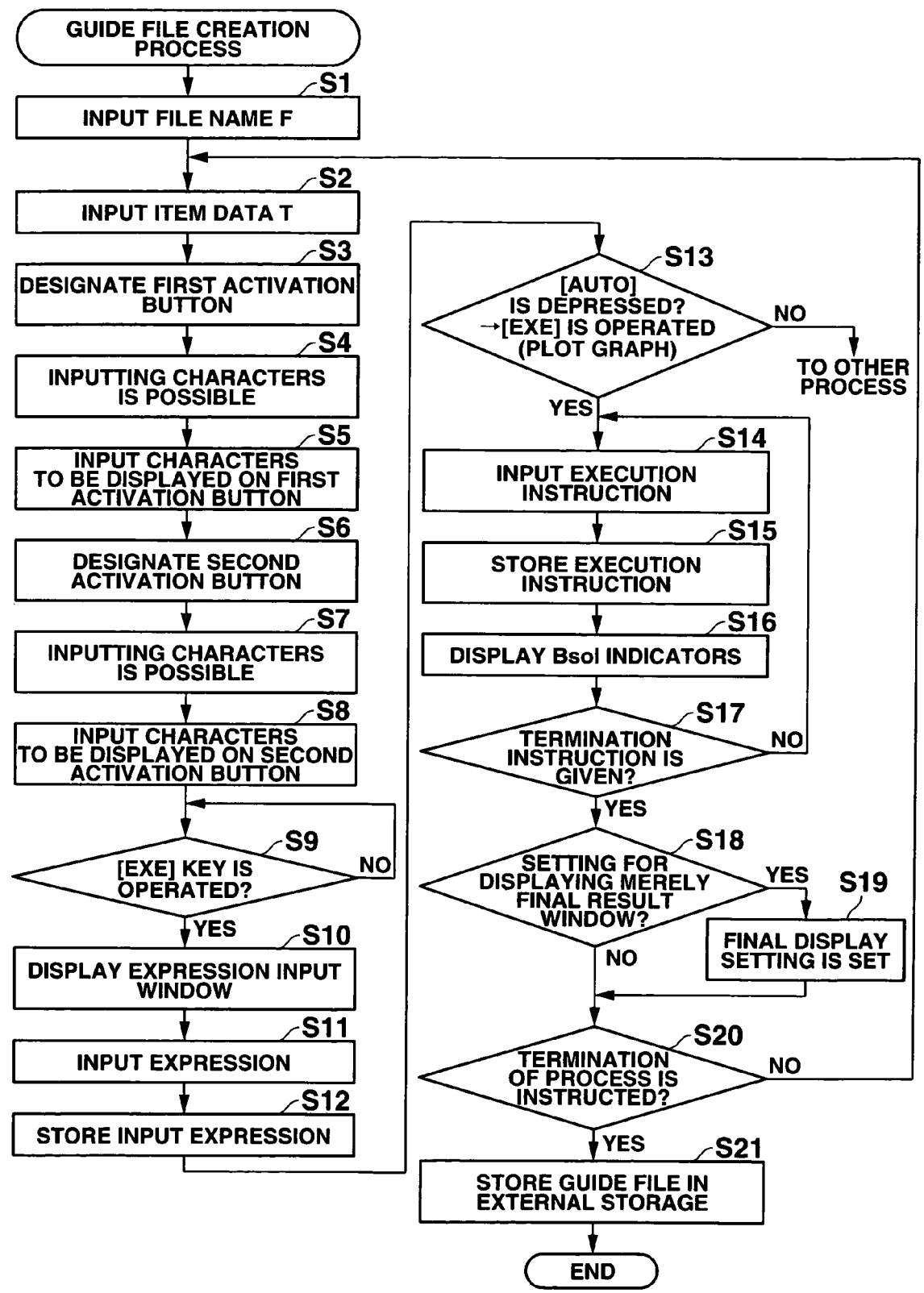
FIG. 16 is a flowchart of a guide file creation process according to the second embodiment.

The first button memory 19e is a storage area for storing setting information of a first activation button set in a guide file creation process shown in FIG. 16. The second button memory 19f stores setting information of a second activation button set in the guide file creation process.

The execution instruction memory 19g stores key data of keys for providing execution instruction set in the guide file creation process.

The final display setting memory 19h stores a value of a flag of final display setting which is set in the guide file creation process.

Stored in the pointer memory 19i is coordinates of a pointer on a graph which is displayed on the LCD 13. The graph data memory 19j stores data of a graph to be plotted on the LCD 13 as bitmap data in conformity to the plot range.

The working area 19k stores a variety of data utilized by the control unit 11 for controlling the graphing calculator 10.

Subsequently, creation of the guide file will be described, in accordance with the present embodiment. When a user (teacher or student) of the graphing calculator 10 (10A or 10B) depresses the menu key 12c of the key input unit 12, the LCD 13 displays a menu window. The menu window includes modes settable in the graphing calculator 10. The user can select an e-Activity mode from the menu. The e-Activity learning is available in the e-Activity mode.

When the user of the graphing calculator 10A (teacher) instructs execution of the guide file creation process, the guide file creation process shown in FIG. 16 is activated.

When the guide file creation process is activated, the user (teacher) firstly inputs a file name F of the guide file to be created (step S1). Further, the teacher inputs item data T (e.g., title of a problem that the teacher gives to the student) for identifying the contents of data to be stored in the guide file (step S2). The data input in the steps S1 and S2 are stored in the file index memory 19d. Also, the LCD 13 displays an e-Activity window Q including the input file name and item data.

The e-Activity window Q preliminary includes a first activation button [GRPH•E] Be and a second activation button [GRPH] Ba. Characters are not necessarily displayed on the first and second activation buttons.

When the teacher designates the first activation button [GRPH•E] Be (step S3), it comes to be possible inputting characters to be displayed on the first activation button (step S4). The teacher inputs the characters to be displayed on the first activation button by operating the key input unit 12 (step S5). The input character data is stored in the first button memory 19e.

Next, when the teacher designates the second activation button [GRPH] Ba (step S6), it comes to be possible inputting characters to be displayed on the second activation button (step S7). The teacher inputs the characters to be displayed on the second activation button by operating the key input unit 12 (step S8). The input character data is stored in the second button memory 19f.

It should be noted that in the case in which the guide file is utilized in the graphing calculator 10B, when the student selects the first activation button, it is possible that the student operates arbitrary keys. On the contrary, when the second activation button is selected, key data is automatically input.

Figure 17:
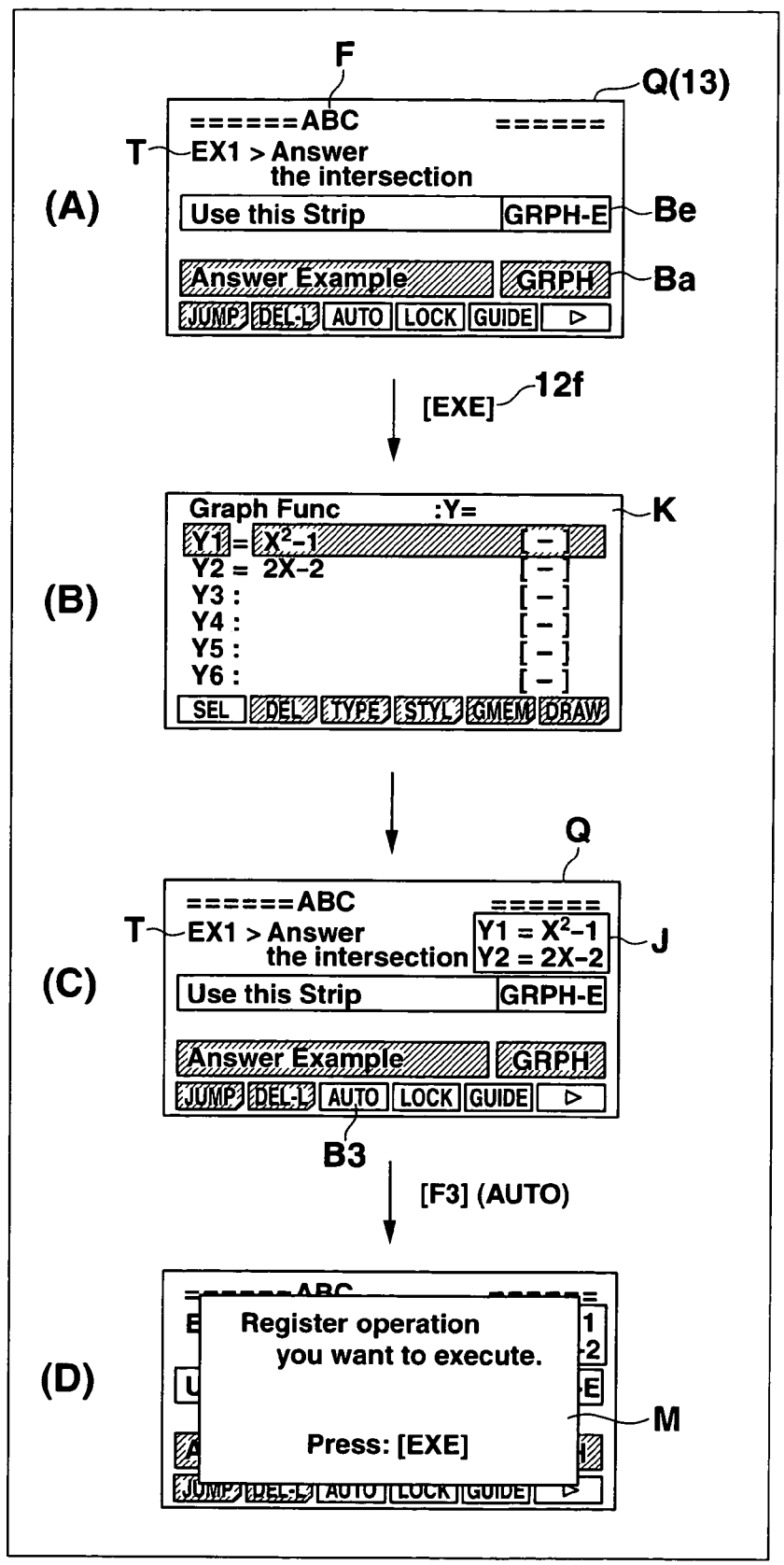
FIG. 17 is a view showing an example of display transition which accompanies the guide file creation process according to the second embodiment.

For example, the LCD 13 of the graphing calculator 10A as indicated by (A) of FIG. 17 shows the display state of the case in which "ABC" has been input as the file name, and "EX1>Answer the instruction" has been input as the item data. Input key data "Use this strip" is displayed in the first activation button [GRPH•E] Be, and input key data "Answer Example" is displayed in the second activation button [GRPH] Ba.

When the teacher operates the execution key 12f ("YES" in step S9), the LCD 13 comes to display an expression input window K (step S10). The teacher can input an arbitrary expression to be graphed in the input window K (step S11). The LCD 13 displays the window K indicated by (B) of FIG. 17 in the case in which expressions "Y1=$X^2$-1" and "Y2=2X-2" are input. The data of the input expressions is stored in the input data memory 19b of the RAM 19 (step S12).

The control unit 11 causes the LCD 13 to display an e-activity window Q as, e.g., (C) of FIG. 17 based on data input in the above steps and stored in storage areas of the RAM 19. The input expressions are displayed in a display area J.

When the teacher operates the function key F3 corresponding to a function indicator B3 (AUTO), the LCD 13 displays start message M for registration of model operation as shown in (D) of FIG. 17. When the teacher operates the execution key 12f, the control unit 11 plots graphs of the input expressions "Y1=$X^2$-1" and "Y2=2X-2" on the LCD 13 (step S13). When the teacher operates the function key F5 corresponding to an indicator which indicates a solving function (G-solve) (step S14), the control unit 11 stores key data of the function key F5 in the execution instruction memory 19g as operational information of key operation for instructing execution of the solving function (step S15). The control unit 11 displays Bsol indicators on a lower side of the display area of LCD 13 (step S16).

To give a termination instruction for storage of the operational procedure of the model operation, the teacher is required to depress the shift key 12*d* and the cursor key "→" simultaneously or sequentially (step S17). When the teacher does not give the termination instruction ("NO" in step S17) but operates the function key F5 corresponding to an indicator "ISCT (Calculate Intersection Point)" (step S14), the control unit 11 additionally stores key data of the function key F5 in the execution instruction memory 19*g* as operational information of key operation for instructing execution of calculation of an intersection point (step S15).

Thereafter, the coordinates of an intersection point of the graph Y1 for "$Y1=X^2-1$" and the graph Y2 for "$Y2=2X-2$" are calculated. The LCD 13 displays a final result window Gsol as indicated by (G) of FIG. 18 (step S16). The calculated coordinates of the intersection point "X=1, Y=0" are displayed in the Gsol window.

As described above, key data input after the operation of the execution key 12*f* in step S9 is stored in the execution instruction memory 19*g* as operational information which indicates the operational procedure of the model operation. Then, the teacher depresses the shift key 12*d* and the cursor key "→" simultaneously or sequentially to instruct the termination of storing the operational procedure of the model operation ("YES" in step S17). Subsequently, the teacher may configure the guide file setting (step S18). The guide file setting is utilized when the guide file is automatically reproduced in the graphing calculator 10B. Namely, the control unit 11 determines whether or not only the final result window Gsol will be displayed on the LCD 13 when the guide file is utilized for the e-Activity learning in the graphing calculator 10B. When the determination result of step S18 is YES, a value of a flag of final display setting is set to "1" and the value of the flag is stored in the final display setting memory 19*h* (step S19). When the guide file, with which "1" is set as the value of the final display setting flag, is utilized for the e-Activity learning in the graphing calculator 10B, merely the final result window is automatically displayed. When the value of the final display setting flag is set to "1", LCD 13 displays an e-Activity window Q as indicated by (H) of FIG. 18. In the e-Activity window Q, an Auto icon I (a character A in the present embodiment) is displayed on the second activation button [GRPH] Ba.

The teacher can instructs to terminate the creation process of the guide file. The control unit 11 determines whether or not the teacher has instructed to terminate the process (step S20).

When the termination is instructed ("YES" in step S20), a variety of information input or generated as described above and stored in the predetermined storage areas prepared in the guide file memory 19S will be stored as is into the external storage 16 (step S21).

The external storage 16 can be detached from the graphing calculator 10A and can be attached to the graphing calculator 10B. Consequently, the user of the graphing calculator 10B (student) comes to be possible to use the created guide file. Alternatively, the created guide file may be exchanged via the USB cable 18*c*.

Subsequently, utilization of a guide file supplied to the graphing calculator 10B will be described. When the user designates utilization of the guide file provided from the graphing calculator 10A, a guide file learning process shown in FIG. 19 is activated.

Figure 19:
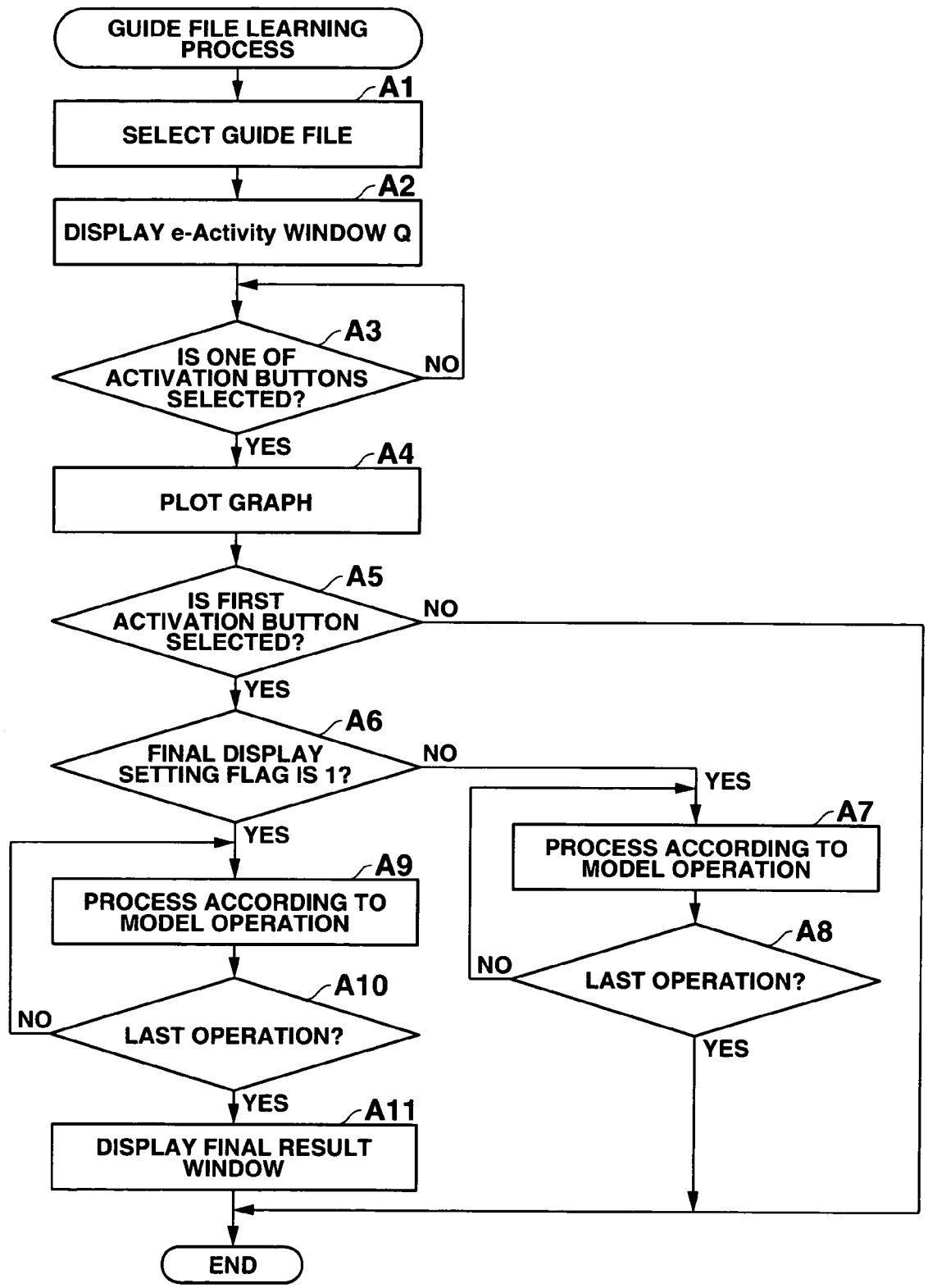
FIG. 19 is a flowchart of a guide file learning process according to the second embodiment.

FIG. 19 is a flowchart of the guide file learning process according to the present embodiment. The guide file learning process is a process in which the user of the graphing calculator 10B (student) studies using guidance information included in the guide file.

When the guide file learning process is activated, the user (student) selects a guide file from one or more guide files supplied from the graphing calculator 10A (step A1). For example, when the guide file, which has been explained by referring to FIGS. 17 and 18, having the file name "ABC" is selected, the LCD 13 of the graphing calculator 10B displays an e-Activity window Q corresponding to the selected guide file (step A2). An example of the e-Activity window Q displayed on the LCD 13 is indicated by (A) of FIG. 20. In the e-Activity window Q, the Auto icon I (a character A in the present embodiment) is displayed on the second activation button [GRPH] Ba. When the student selects one of the first activation button [GRPH•E] Be and the second activation button [GRPH] Ba and operates the execution key 12*f* ("YES" in step A3), the control unit 11 plots graphs of expressions stored in the selected guide file on the LCD 13 (step A4). The graphs of expressions "$Y1=X^2-1$" and "$Y2=2X-2$" is shown in (B) of FIG. 20.

The control unit 11 determines whether the user has selected the first activation button [GRPH•E] Be or the second activation button [GRPH] Ba (step A5). When it is determined that the user has selected the first activation button [GRPH•E] Be ("NO" in step A5), it is considered that the student has selected to study the graph by manually operating the keys. Thereafter, the user studies the graph by usual key operation without utilizing the e-Activity learning.

On the other hand, when it is determined that the user has selected the second activation button [GRPH] Ba ("YES" in step A5), it is considered that the student has selected the automatic execution of the model operation. Then, the control unit 11 determines whether or not the value the final display setting flag contained in the selected guide file is "1" (step A6).

When it is determined that the value of the final display setting flag is not "1" ("NO", in step A6), key data contained in the operational information of the model operation stored in the selected guide file is automatically input, and the control unit 11 performs a process according to the automatic input (step A7). The LCD 13 displays a window corresponding to the automatic input as shown by (C) and (D) of FIG. 20. When the last automatic input of key data contained in the operational information of the model operation is executed ("YES" in step A8), the LCD 13 displays the final result window Gsol. Thereafter, the present process is terminated.

More specifically, when the key data of the function key F5 corresponding to the indicator of the solving function (G-solve) is automatically input, the control unit 11 displays Bsol indicators at the bottom of the display area of the LCD 13. When the key data of the function key F5 corresponding to the indicator of "ISCT (Calculate Intersection Point)" is automatically input, the control unit 11 calculates the coordinate of the intersection point of the graphs Y1 and Y2. The control unit 11 subsequently displays the final result window Gsol indicated by (D) of FIG. 10 on the LCD 13. Displayed on the Gsol window is the calculated coordinates of the intersection point "X=1, Y=0".

Figure 20:
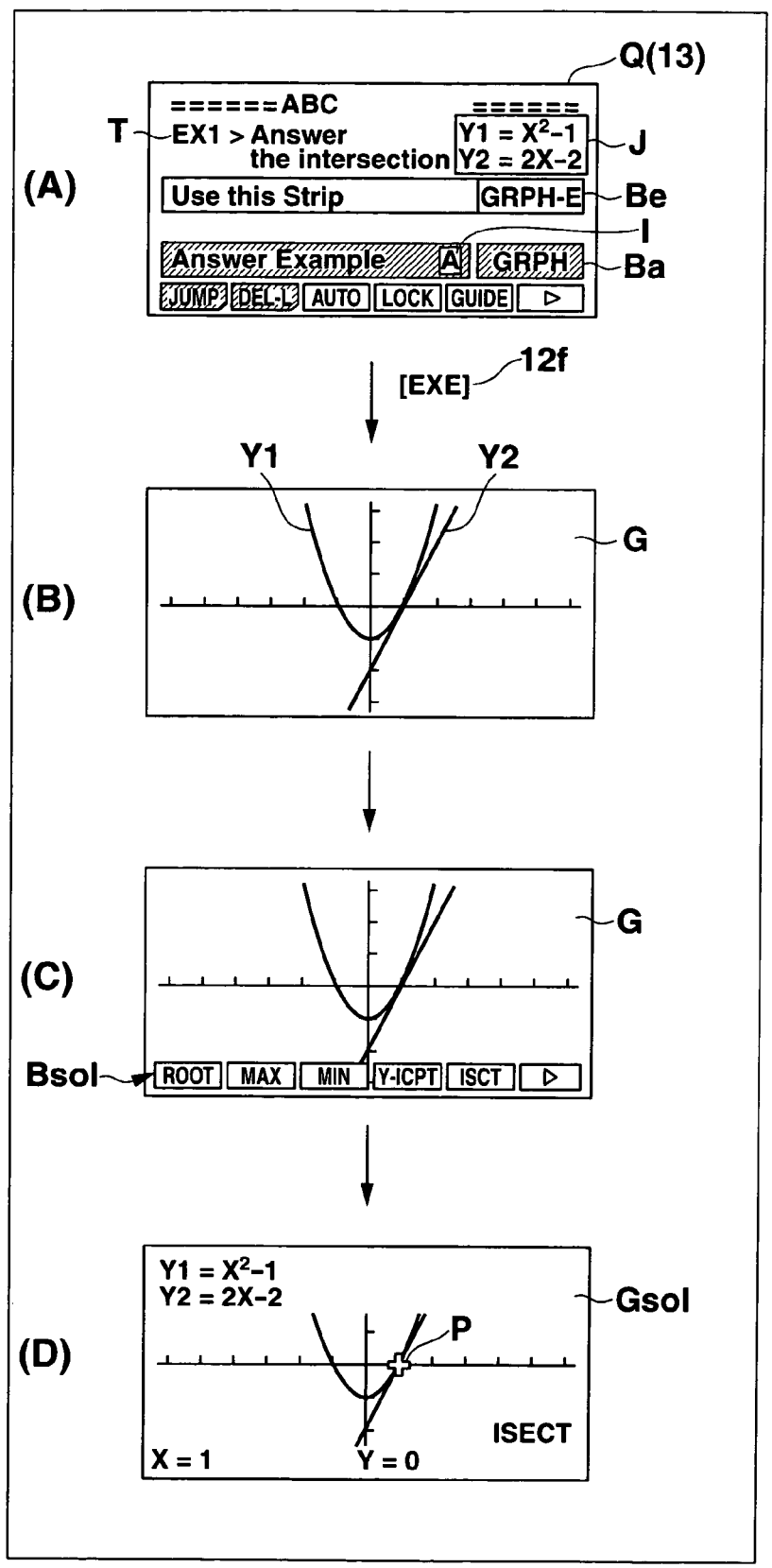
FIG. 20 is a view showing an example of display transition which accompanies the guide file learning process according to the second embodiment.

As described above, the student merely selects the second activation button [GRPH] Ba from the e-Activity window Q ((A) of FIG. 20) and operates the execution key 12*f*, then the model operation executed by the teacher will be automatically executed in the graphing calculator 10B. The student can easily confirm the model operation performed by the teacher.

On the other hand, when it is determined that the value of the final display setting flag is set to "1" ("YES", in step A6), key data contained in the operational information of the model operation stored in the selected guide file is automatically input, and the control unit 11 performs a process according to the automatic input (step A9). It should be noted that the display of the LCD 13 changes from (A) of FIG. 21 to (B) of FIG. 21. In the display state indicated by (B) of FIG. 21, a message M is displayed while the screen display corresponding to the automatic input is not performed.

When the last automatic input of key data contained in the operational information of the model operation is executed ("YES" in step A10), the LCD 13 displays the final result window Gsol (step A11). Displayed on the Gsol window is the calculated coordinates of the intersection point "X=1, Y=0". Thereafter, the present process is terminated.

As described above, according to the graphing calculator 10 of the present embodiment, the teacher can store, into a guide file, operational information of model operation that the teacher desires the student to perform. The student can select to manually operate keys or to allow automatic input of the keys for utilizing the operational information of the model information. The teacher may preliminary set whether or not merely the final result window is displayed when the user has selected the automatic input. Accordingly, setting can be configured in consideration with a learning level or a proficiency level of the student.

Other Embodiments

In the above second embodiment, described is the solving function (G-solve) for obtaining the coordinates of the intersection point of graphs Y1 and Y2. However, the solving function is not limited to obtaining the coordinates of the intersection point. The solving function may be used for obtaining the coordinates of maximum and minimum points of the graphs. Alternatively, the solving function may display a variety of characteristic points while a pointer is tracing a graph (graph trace).

Figure 18:
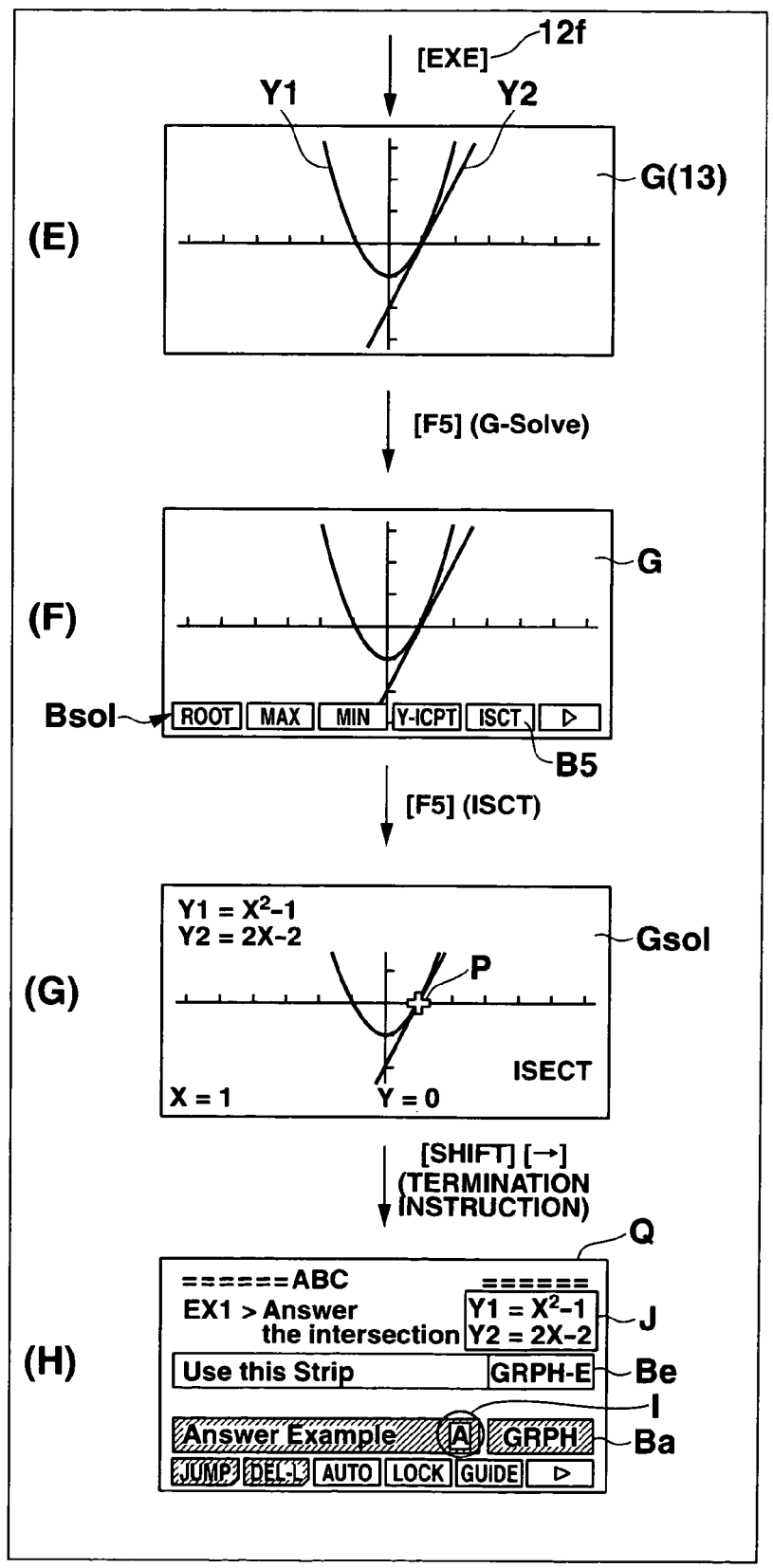
FIG. 18 is a view continuous with the view of FIG. 17.
Figure 21:
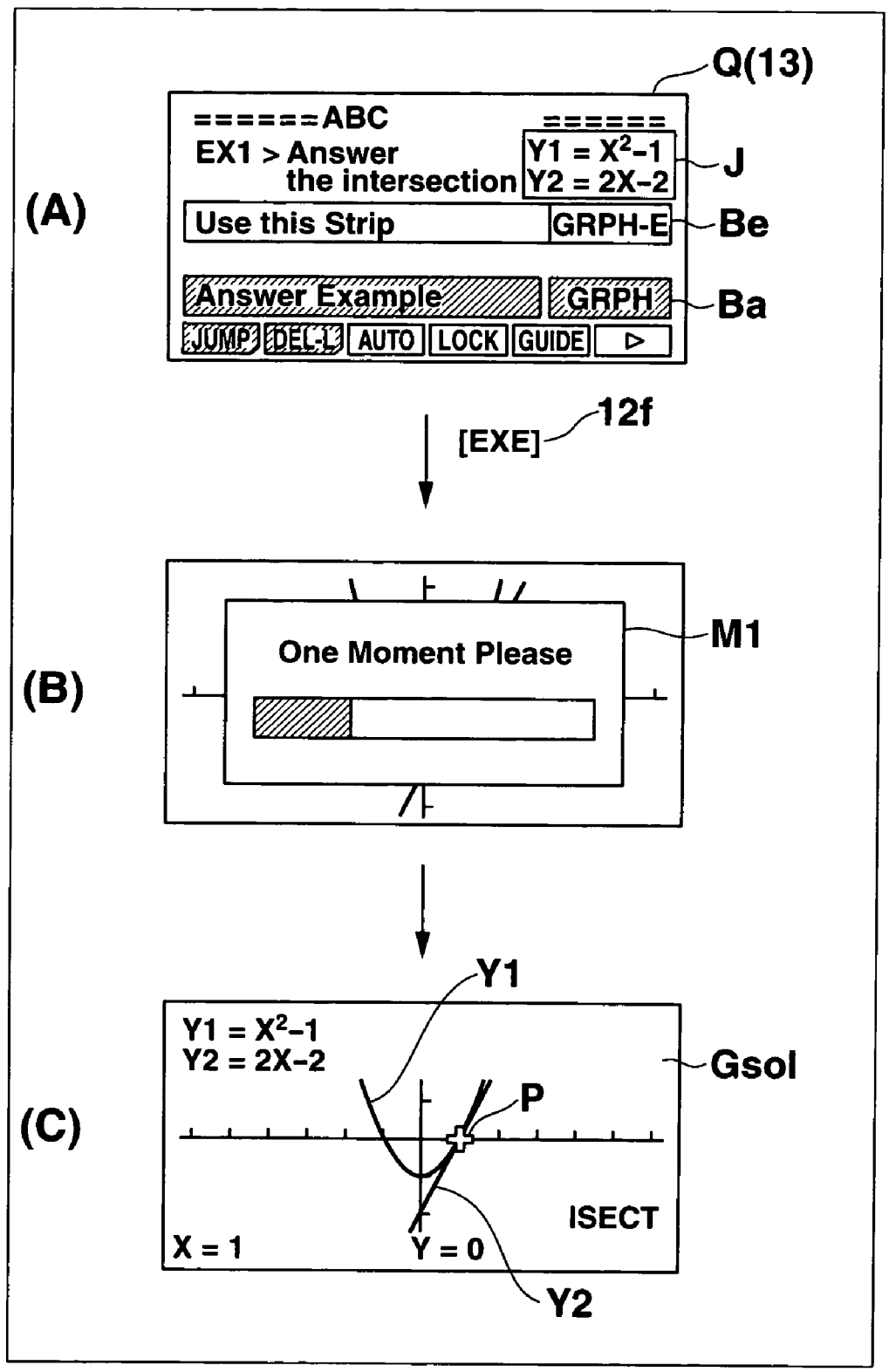
FIG. 21 is a view showing another example of display transition which accompanies the guide file learning process according to the second embodiment.

The methods of the processes of the graphing calculator 10 described in the above embodiments, that is, the guide file creation process according to the first embodiment shown in the flowchart of FIG. 5, the guidance information process described with reference to FIGS. 6 to 10 according to the first embodiment, the guide file learning process described with reference to FIG. 11 to 14 according to the first embodiment, the guide file creation process described with reference to FIGS. 16 to 18 according to the second embodiment, and the guide file learning process described with reference to FIGS. 19 to 21, may be stored in the external storage 16 such as a memory card (e.g., a ROM card and a RAM card), a magnetic disk (e.g., a floppy disk and a hard disk), an optical disk (e.g., a CD-ROM and a DVD), or a semiconductor memory, to be distributed as a computer-executable program. As the storage reader/writer 17 reads the program stored in the external storage medium 16 and the operation of the computer is controlled based on the read program, the e-Activity learning described in the above embodiments can be realized and the above-described methods allows the execution of the same processes.

The data of the program to implement the methods can be transmitted through the network Nt as program codes. It is also possible to acquire the program data by the communication controller 18 of a computer terminal being connected to the network Nt to implement the above-described e-Activity learning.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A graphing calculation apparatus having a function calculating operation, comprising:
    a mode setting unit configured to set one of a manual mode and an automatic mode based on an instruction made by a user;
    a key data input unit configured to input key data in accordance with operation of a key input unit performed by the user;
    a key data registering unit configured to register the key data input by the key data input unit in association with setting contents of the manual mode or the automatic mode set by the mode setting unit;
    a first function operation executing unit configured to cause the function calculating operation to be performed based on the key data registered in the key data registering unit;
    a key guide display unit configured to read the registered key data from the key data registering unit in order of storage in order to execute guide display;
    a guide display control unit configured to, upon executing the guide display of the key data by the key guide display unit, cause subsequent key data to be subjected to the guide display each time inputting of the key data subjected to the guide display by the key data input unit is confirmed, in a case in which the key guide display unit displays key data associated with the manual mode, and to automatically and successively input key data subjected to the guide display in order to cause subsequent key data to be subjected to the guide display, in a case in which the key guide display unit displays key data associated with the automatic mode; and
    a second function operation executing unit configured to cause the function calculating operation to be performed based on the key data which is input along with control of the guide display by the guide display control unit.

2. The graphing calculation apparatus according to claim 1, further comprising:
    a comment data input unit configured to input comment data in accordance with operation of the key input unit performed by the user after the key data input unit inputs the key data; and
    a comment data registering unit configured to register the comment data input by the comment data input unit in association with the key data input by the key data input unit,
    wherein in accordance with reading the key data registered by the key data registering unit in an input order and executing the guide display, the key guide display unit reads the comment data registered by the comment data registering unit and associated with the key data subjected to the guide display in order to perform the guide display.

3. The graphing calculation apparatus according to claim 1, further comprising:

a guide speed setting unit configured to set a guide speed of the guide display in accordance with a user operation when the mode setting unit sets the automatic mode, wherein the guide display control unit, upon executing the guide display of the key data by the key guide display unit, automatically and successively inputs the key data subjected to the guide display in accordance with the guide speed set by the guide speed setting unit in order to cause subsequent key data to be subjected to the guide display, in the case in which the key guide display unit displays key data associated with the automatic mode.

4. The graphing calculation apparatus according to claim 1, wherein the key data input unit inputs key data for each key operation by the user of the key input unit.

5. The graphing calculation apparatus according to claim 1, wherein the key data input unit inputs key data for a series of keys in accordance with operation of the key input unit performed by the user, and the key guide display unit reads the key data registered by the key data registering unit in an input order in order to perform the guide display.

6. A non-transitory computer readable medium having stored thereon a computer readable calculator control program for controlling a computer of a graphing calculation apparatus having a function calculating operation, the program being executable to cause the computer to function as elements comprising:

a mode setting unit configured to set one of a manual mode and an automatic mode based on an instruction made by a user;

a key data input unit configured to input key data in accordance with operation of a key input unit performed by the user;

a key data registering unit configured to register the key data input by the key data input unit in association with setting contents of the manual mode or the automatic mode set by the mode setting unit;

a first function operation executing unit configured to cause the function calculating operation to be performed based on the key data registered in the key data registering unit;

a key guide display unit configured to read the registered key data from the key data registering unit in order of storage in order to execute guide display;

a guide display control unit configured to, upon executing the guide display of the key data by the key guide display unit, cause subsequent key data to be subjected to the guide display each time inputting of the key data subjected to the guide display by the key data input unit is confirmed, in a case in which the key guide display unit displays key data associated with the manual mode, and to automatically and successively input key data subjected to the guide display in order to cause subsequent key data to be subjected to the guide display, in a case in which the key guide display unit displays key data associated with the automatic mode; and a second function operation executing unit configured to cause the function calculating operation to be performed based on the key data which is input along with control of the guide display by the guide display control unit.

* * * * *